United States Patent
Garceau et al.

(10) Patent No.: US 9,028,238 B2
(45) Date of Patent: May 12, 2015

(54) MOLDING APPARATUS AND METHOD

(75) Inventors: Mark Garceau, Bethlehem, CT (US);
Mark Kaltenborn, Ridgefield, CT (US);
Alex Shafir, Watertown, CT (US);
Robert Jennings, Waterbury, CT (US)

(73) Assignee: Sealed Air Corporation (US), Charlotte, NC (US)

( * ) Notice: Subject to any disclaimer, the term of this patent is extended or adjusted under 35 U.S.C. 154(b) by 363 days.

(21) Appl. No.: 13/526,775

(22) Filed: Jun. 19, 2012

(65) Prior Publication Data

US 2013/0216638 A1 Aug. 22, 2013

Related U.S. Application Data

(63) Continuation-in-part of application No. 13/398,349, filed on Feb. 16, 2012.

(51) Int. Cl.
| | |
|---|---|
| *B29C 43/58* | (2006.01) |
| *B29C 44/18* | (2006.01) |
| *B29C 43/06* | (2006.01) |
| *B29C 43/22* | (2006.01) |
| *B29C 44/60* | (2006.01) |
| *B29C 43/32* | (2006.01) |
| *B29C 43/34* | (2006.01) |
| *B29L 31/00* | (2006.01) |
| *B29K 75/00* | (2006.01) |

(52) U.S. Cl.
CPC ............ *B29C 44/182* (2013.01); *B29C 43/06* (2013.01); *B29C 43/22* (2013.01); *B29C 2043/3283* (2013.01); *B29C 2043/3422* (2013.01); *B29C 2043/3483* (2013.01); *B29L 2031/712* (2013.01); *B29L 2031/7138* (2013.01); *B29K 2075/00* (2013.01); *B29C 44/60* (2013.01)

(58) Field of Classification Search
CPC .............................................. B29C 2043/3483
USPC .......................................... 425/433, 145, 253
See application file for complete search history.

(56) References Cited

U.S. PATENT DOCUMENTS

| | | | |
|---|---|---|---|
| 3,142,864 A | 8/1964 | Pelley | |
| 3,300,944 A | 1/1967 | Thesing | |
| 3,485,347 A | 12/1969 | McGill et al. | |
| 3,566,448 A | 3/1971 | Ernst | |
| 3,736,081 A | 5/1973 | Yovanovich | |
| 3,837,774 A | 9/1974 | Ross et al. | |
| 4,128,369 A | 12/1978 | Kemerer et al. | |
| 4,149,840 A | 4/1979 | Tippmann | |
| 4,207,279 A | 6/1980 | Boon | |
| 4,265,608 A | 5/1981 | Tunador et al. | |
| 4,290,248 A * | 9/1981 | Kemerer et al. | 52/309.16 |
| 4,981,427 A | 1/1991 | Prignitz | |
| 5,027,583 A | 7/1991 | Chelak | |
| 5,167,781 A | 12/1992 | Kemerer et al. | |

(Continued)

*Primary Examiner* — Yogendra Gupta
*Assistant Examiner* — Kimberly A Stewart
(74) *Attorney, Agent, or Firm* — Thomas C. Lagaly

(57) ABSTRACT

A molding apparatus for making a continuous molded article or continuous series of molded articles generally includes a pair of spaced-apart molding assemblies, which cooperatively generate a movable mold having a dynamic mold-cavity therein, each of the molding assemblies including a series of movable mold segments, which are adapted to fit together to form a portion of the dynamic mold-cavity, a drive mechanism for conveying the mold segments along a path, and a dispenser for dispensing a moldable, expandable material into the dynamic mold-cavity.

8 Claims, 23 Drawing Sheets

(56) References Cited

U.S. PATENT DOCUMENTS

| | | |
|---|---|---|
| 5,244,618 A | 9/1993 | Kemerer et al. |
| 5,330,341 A | 7/1994 | Kemerer et al. |
| 5,376,219 A | 12/1994 | Sperry et al. |
| 5,458,477 A | 10/1995 | Kemerer et al. |
| 5,505,599 A | 4/1996 | Kemerer et al. |
| 5,700,495 A | 12/1997 | Kemerer et al. |
| 5,776,510 A | 7/1998 | Reichental et al. |
| 6,003,288 A | 12/1999 | Sperry et al. |
| 6,085,627 A | 7/2000 | Denney |
| 6,178,725 B1 | 1/2001 | Sperry et al. |
| 6,386,850 B1 | 5/2002 | Salerno et al. |
| 6,472,638 B1 | 10/2002 | Sperry et al. |
| 7,607,911 B2 | 10/2009 | Sperry et al. |
| 2005/0287238 A1 | 12/2005 | Taylor |
| 2007/0052128 A1 | 3/2007 | Taylor |
| 2007/0252298 A1 | 11/2007 | Sperry et al. |
| 2010/0201014 A1* | 8/2010 | Taylor .......................... 264/46.2 |

* cited by examiner

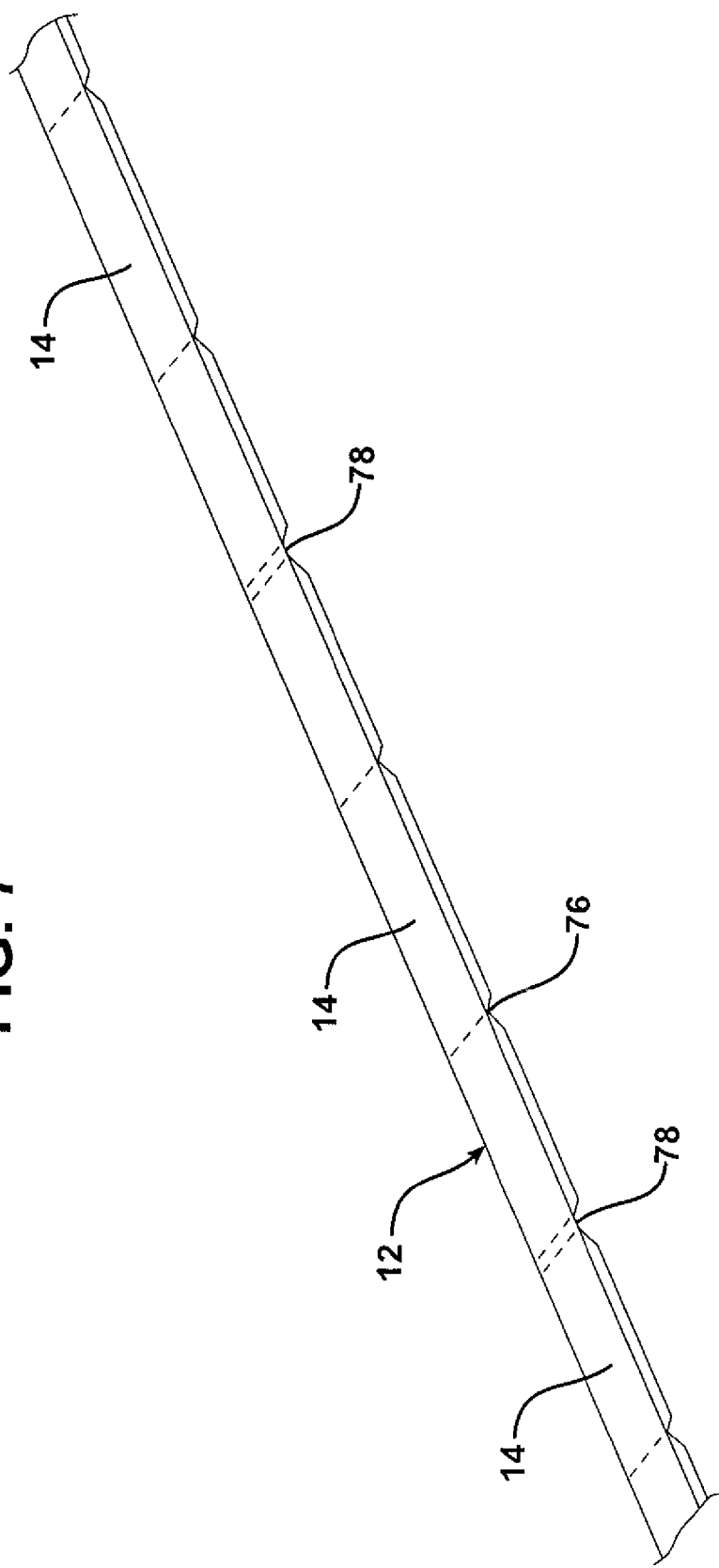

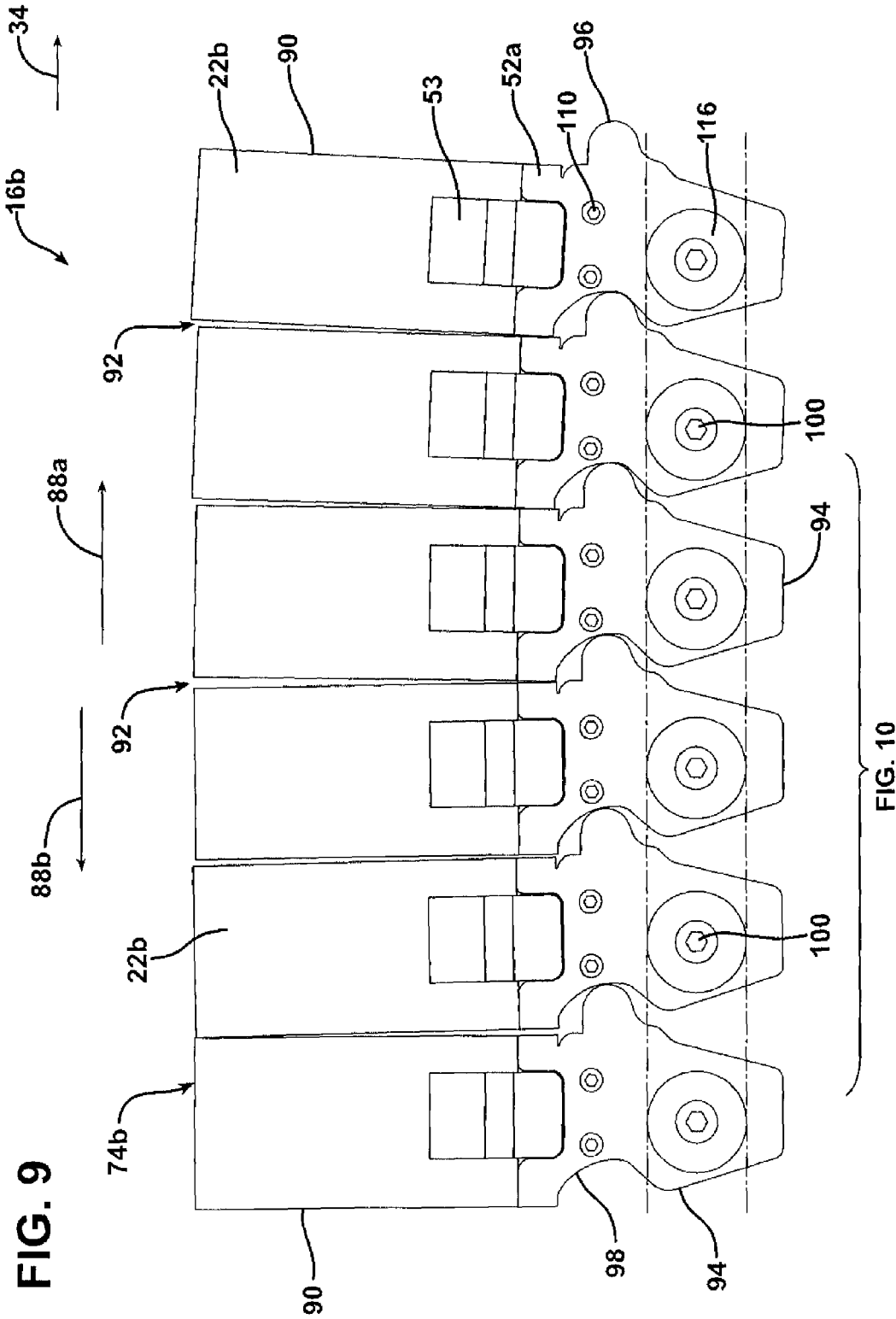

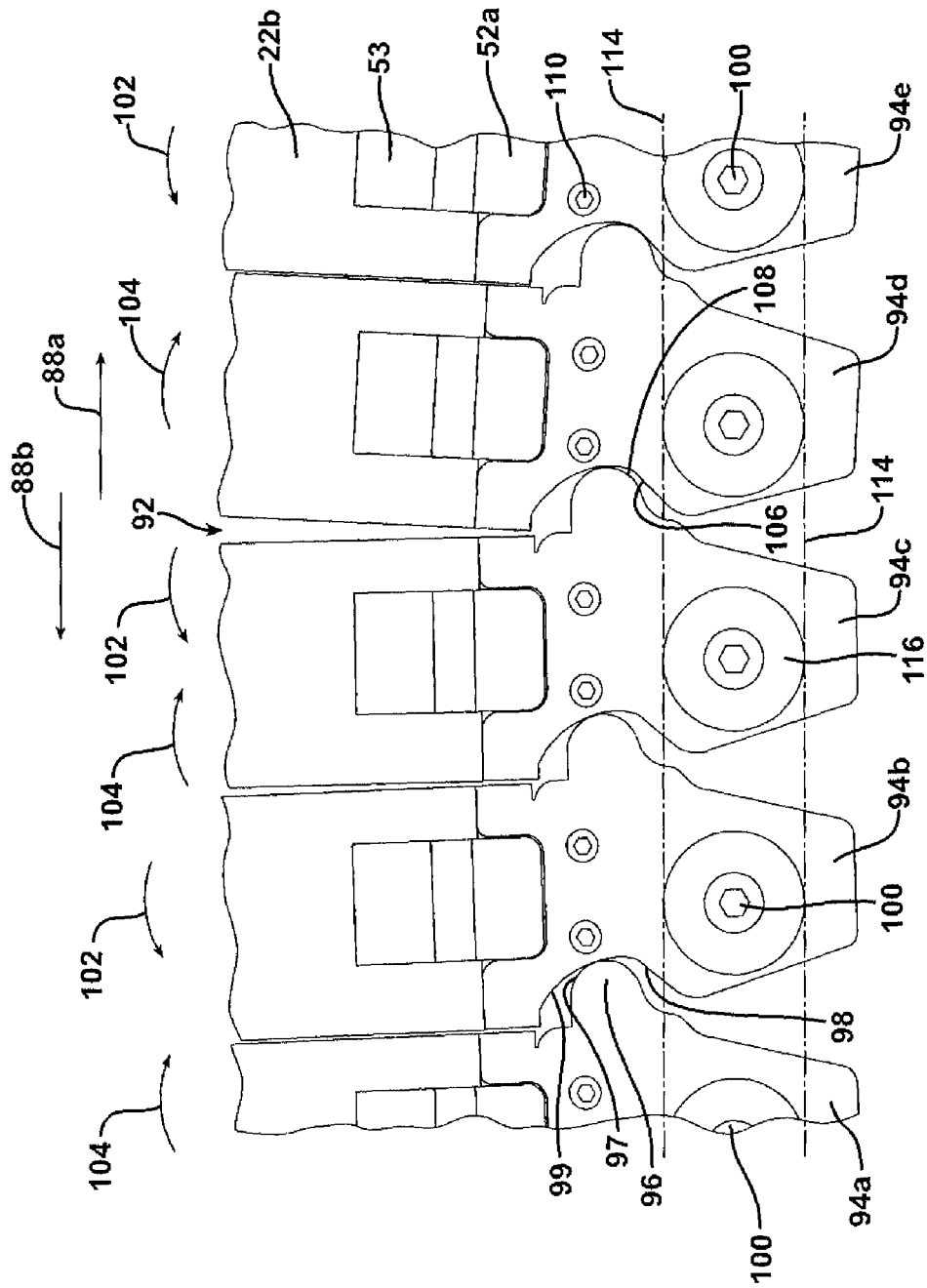

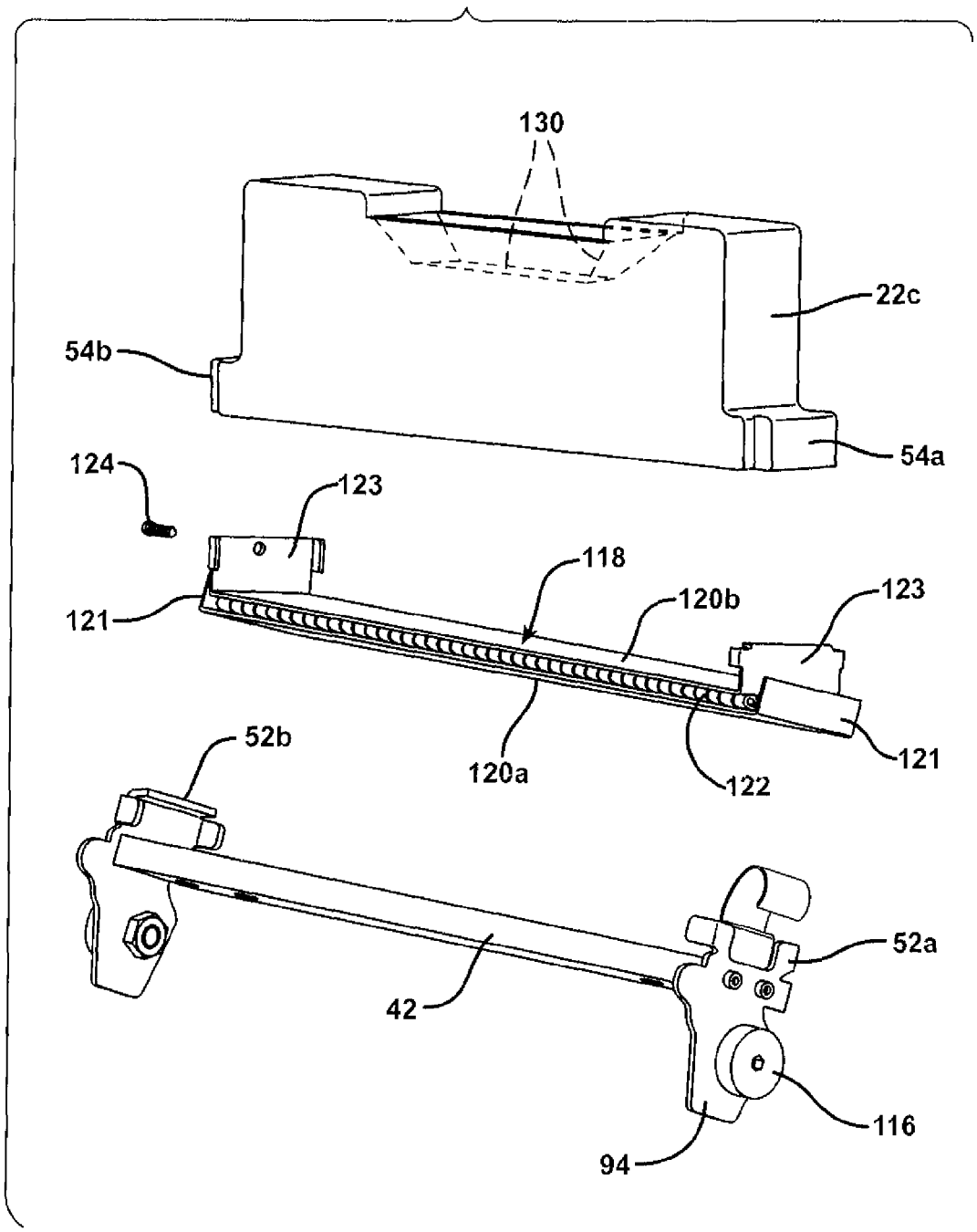

MOLDING APPARATUS AND METHOD

This application is a Continuation-in-Part of U.S. patent application Ser. No. 13/398,349, filed Feb. 16, 2012, the disclosure of which is hereby incorporated herein by reference thereto.

BACKGROUND OF THE INVENTION

The present invention relates to a molding apparatus, and more particularly, to a molding apparatus for making continuous molded articles, including continuous series of such articles.

Foam-in-place packaging is a highly useful technique for on-demand protection of packaged products. In its most basic form, foam-in-place packaging comprises injecting foamable compositions from a dispenser into a container that holds a product to be cushioned. Typically, the product is wrapped in plastic to keep it from direct contact with the rising (expanding) foam. As the foam rises, it expands into the remaining space between the product and its container (e.g. a box formed of corrugated paperboard), thus forming a custom cushion for the product.

A common foaming composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged product.

In other types of foam-in-place packaging, the foam precursors are injected into a plastic bag, which is then dropped into a container holding the product to be cushioned. The rising foam again tends to expand into the available space, but does so inside the bag. Because the bags are formed of flexible plastic, they form individual custom foam cushions for the packaged products. In several techniques, a specific apparatus is used to make the bag from plastic film while concurrently injecting it with foam. Exemplary devices for making such 'foam-in-bag' packaging cushions are assigned to the assignee of the present invention, and are illustrated, for example, in U.S. Pat. Nos. 5,027,583, 5,376,219, and 6,003,288, the contents of each of which are hereby incorporated entirely herein by reference thereto.

In other packaging applications, similar or identical products are repeatedly placed in similar or identical orientations in similar or identically sized containers. Such circumstances increase the need for more standard packaging elements that have a consistent size and shape.

U.S. Pat. Nos. 5,776,510, 6,386,850, and 7,607,911, the contents of each of which are hereby incorporated entirely herein by reference thereto, disclose methods and apparatus for automatically molding defined three-dimensional polyurethane foam cushions utilizing the foam-in-bag techniques discussed above, but with the added feature of placing a bag containing a foamable composition in a mold as the composition begins to form foam, and maintaining the bag in the mold until the composition has finished forming a foam cushion in a shape conforming to the shape of the mold. These inventions have beneficially combined the advantages of on-demand, foam-in-bag packaging with the ability to produce standard packaging cushions having a consistent size and shape.

While the forgoing molding techniques have been highly successful, the inventors hereof have determined that for high-volume molding applications, a molding apparatus and method for making a continuous molded article and/or continuous series of molded articles, e.g., which may be separated into a series of foam-in-bag molded cushions, would be highly beneficial. One approach for making a continuous molded foamed article, or a series thereof, is to employ a pair of spaced-apart molding assemblies, e.g., comprising a pair of counter-rotating endless belts, which drive a series of movable mold segments that align and converge to form a movable mold with a dynamic mold cavity therein. A dispenser of a moldable, expandable composition, e.g., a polyurethane foam composition as described above, may further be employed to dispense the composition into the dynamic mold-cavity on a continuous basis, with a film-feeding mechanism also employed to continuously feed a center-folded film, or a pair of films, into the dynamic mold-cavity, such that the film is interposed between the moldable composition and the molding assemblies.

A significant difficulty with the foregoing approach is that the dynamic nature of the process makes it difficult to maintain a consistent mold-cavity shape. In order for the dynamic mold-cavity to form a desired mold shape, the movable mold segments must maintain a predetermined alignment as they are conveyed along a path in each molding assembly. However, after the initial introduction of the expandable, e.g., foamable, composition into the dynamic mold-cavity, the composition expands as it hardens into a foam. Such expansion and hardening occurs as the composition is conveyed within the dynamic mold-cavity, the shape of which must be maintained by the moving mold segments as the expanding foam exerts a force against such segments, due to physical contact therebetween. The magnitude of the force increases as the foam expands to fully fill the cavity, due to the increased area of contact in the mold-cavity between the expanding foam and the moving mold segments.

As may be appreciated, certain directional components of the expanding foam-force, e.g., in the direction along which the segments are being conveyed, has a tendency to cause the mold segments to deviate from their predetermined alignment, i.e., to push the mold segments out of alignment during their conveyance along the moving mold path. This tendency exists because of the dynamic nature of the continuous molding process—since the mold segments are movable, they can be moved not only in the direction of conveyance, which is desired, but can also be moved out of their mold-shape alignment, which is highly undesirable because such misalignment results in a poorly-formed molded article at best, and a catastrophic failure of the molding assembly at worst.

Another difficulty associated with the foregoing continuous molding process concerns proper alignment of both the foam dispensing device and sealing equipment used to seal the foam inside the film, vis-à-vis the dynamic mold-cavity. By changing the mold segments, the shape of the mold-cavity can be changed to produce molded articles having a desired shape. Such changes in the mold shape often necessitate the ability to inject the foam at different positions, e.g., to coincide with the widest or deepest part of the mold-cavity, and/or to seal the film at variable positions.

A further difficulty of continuous molding pertains to the release of the mold segments from the molded article at the end of the dynamic mold-cavity. With an endless-belt type molding assembly, for example, the mold segments diverge in a rotational fashion from the mold-cavity at a rotary guide member. Depending on the shape of the molded article, such release can be difficult to accomplish without causing damage to the molded article.

In many instances, the geometry of the dynamic mold-cavity will continuously change, resulting in a molded article having a variable geometry. While useful for creating custom-fitting packaging cushions, such changes present challenges in a continuous molding process, given that the quantities of film and/or foam needed to produce the cushion can change as the geometry of the dynamic mold-cavity changes. Deeper mold geometries in one or the other molding assembly can also make proper film-placement more difficult.

Accordingly, there remains a need in the art for improvements in the machines and processes for making a continuous molded article or continuous series of molded articles, which overcome the foregoing difficulties.

SUMMARY OF THE INVENTION

Those needs are met by the present invention, which, in one aspect, provides a molding apparatus for making a continuous molded article or continuous series of molded articles, comprising:

a. a pair of spaced-apart molding assemblies, which cooperatively generate a movable mold having a dynamic mold-cavity therein, each of the molding assemblies comprising:
   1) a series of movable mold segments, which are adapted to fit together to form a portion of the dynamic mold-cavity, and
   2) a drive mechanism for conveying the mold segments along a path at a controlled rate, each of the mold segments affixed to the drive mechanism with a predetermined alignment to continuously form the portion of the dynamic mold-cavity as the mold segments are conveyed along the path;

b. a dispenser for dispensing a moldable material into the dynamic mold-cavity at a controlled rate;

c. a film-feeding mechanism for feeding one or more films from a source thereof at a controlled rate and into the dynamic mold-cavity such that the films are interposed between the moldable material and the molding assemblies;

d. a controller for controlling at least one of the drive mechanism, dispenser, and film-feeding mechanism;

e. an indicator associated with one or more of the mold segments; and f. a sensor positioned on the molding apparatus for detecting the presence of the indicator, the sensor being operative to send a signal to the controller upon detecting the presence of the indicator at a predetermined location on the apparatus, wherein, upon receipt of the signal from the sensor, the controller changes the rate of at least one of the conveyance of the mold segments, dispensation of the moldable material, and feeding of the films.

Another aspect of the invention is directed to a molding apparatus for making a continuous molded article or continuous series of molded articles, comprising:

a. a pair of spaced-apart molding assemblies, which cooperatively generate a movable mold having a dynamic mold-cavity therein, each of the molding assemblies comprising:
   1) a series of movable mold segments, which are adapted to fit together to form a portion of the dynamic mold-cavity, and
   2) a drive mechanism for conveying the mold segments along a path at a controlled rate, each of the mold segments affixed to the drive mechanism with a predetermined alignment to continuously form the portion of the dynamic mold-cavity as the mold segments are conveyed along the path;

b. a dispenser for dispensing a moldable material into the dynamic mold-cavity at a controlled rate; and c. a film-feeding mechanism for feeding one or more films from a source thereof at a controlled rate into the dynamic mold-cavity such that the films are interposed between the moldable material and the molding assemblies, the film-feeding mechanism including a film-guide device to effect the feeding of the films into the dynamic mold-cavity at a predetermined angle.

These and other aspects and features of the invention may be better understood with reference to the following description and accompanying drawings.

BRIEF DESCRIPTION OF THE DRAWING

FIG. 7 is a perspective view of the continuous molded article produced by the apparatus shown in FIG. 1;

FIG. 9 is an elevational view of a portion of the apparatus shown in FIG. 2;

FIG. 10 is a partial expanded view of the apparatus as indicated in FIG. 9;

FIG. 11 is an exploded perspective view of an alternative embodiment in accordance with the invention;

DETAILED DESCRIPTION OF THE INVENTION

Figure 1:
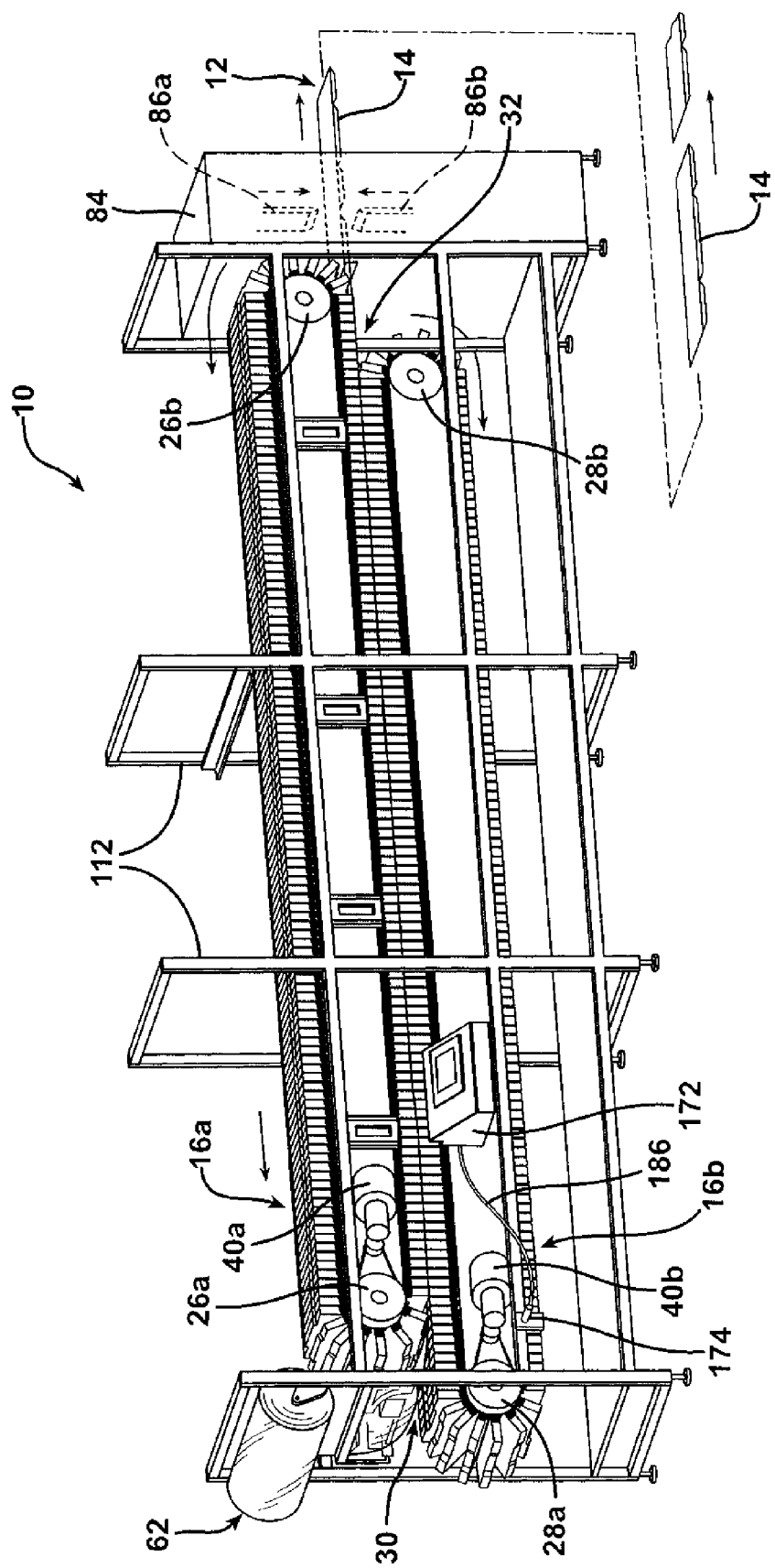
FIG. 1 is a perspective view of a molding apparatus in accordance with the present invention for making a continuous molded article or series thereof.
Figure 2:
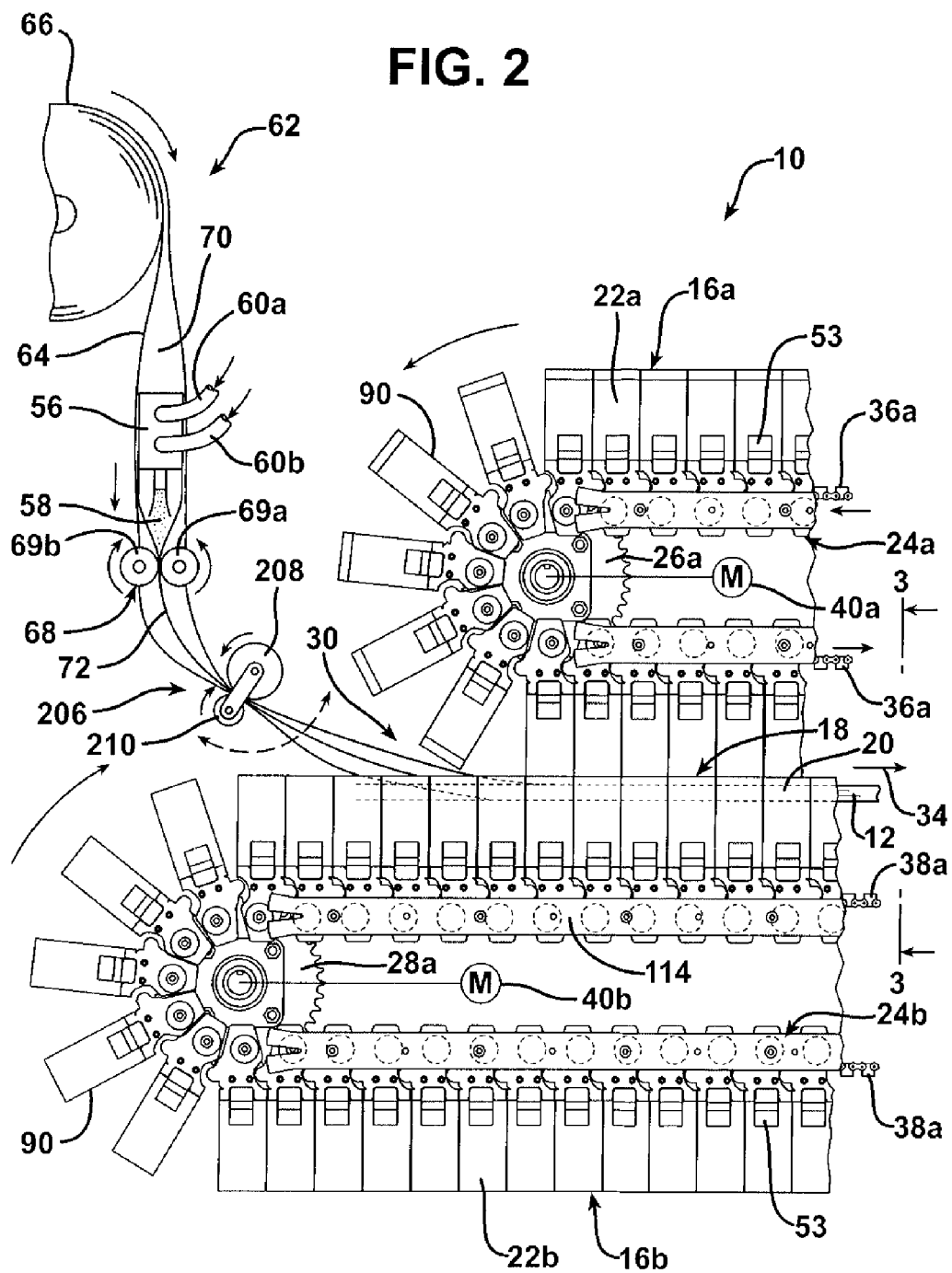
FIG. 2 is a partial elevational view of the apparatus shown in FIG. 1.
Figure 3:
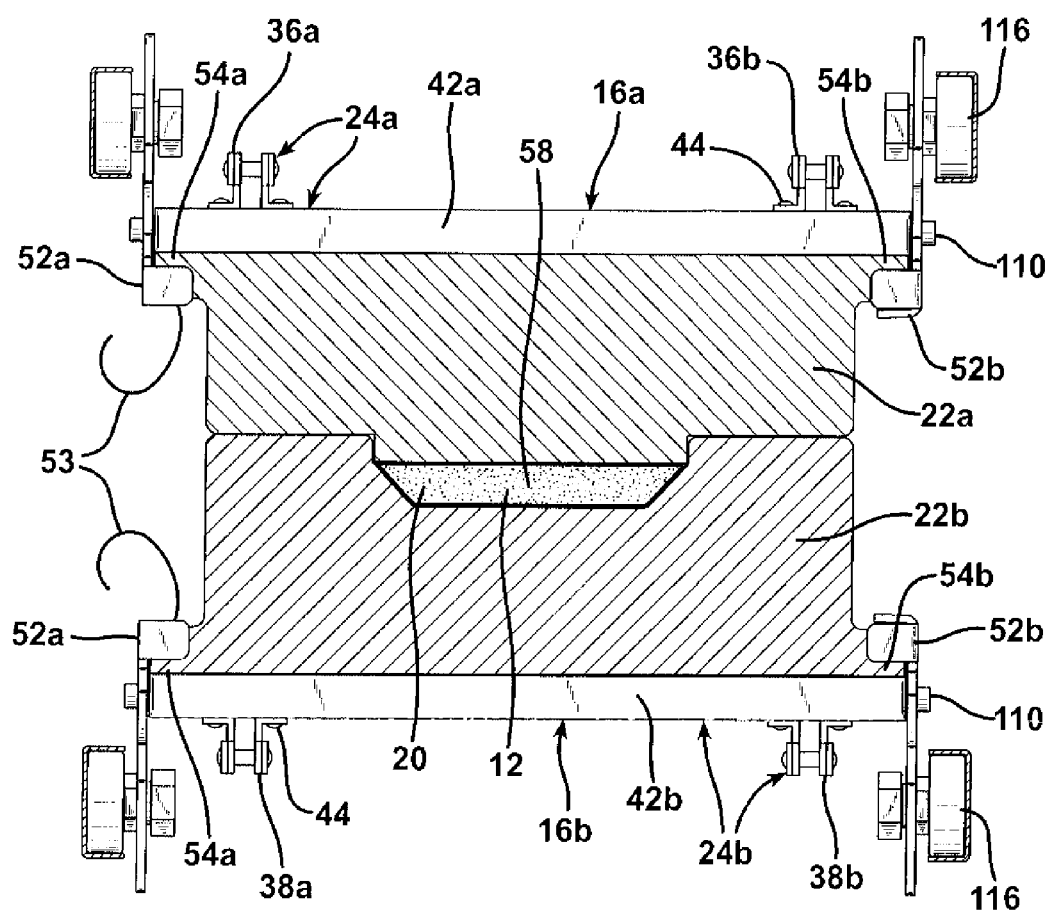
FIG. 3 is a cross-sectional view of the apparatus taken along lines 3-3 in FIG. 2.

Referring to FIGS. 1-3, a molding apparatus 10 in accordance with the present invention will be described. Apparatus 10 makes a continuous molded article 12, which may be in the form of a continuous series of, e.g., separable, molded articles, which may be separated into a series of individual molded articles 14 as shown. Apparatus 10 includes a pair of spaced-apart molding assemblies 16a, b, which cooperatively generate a movable mold 18 (FIG. 2) having a dynamic mold-cavity 20 therein (FIG. 3).

Each of the molding assemblies 16a, b comprise a series of movable mold segments 22a, b, respectively, which are adapted to fit together to form a portion, e.g., half, of the dynamic mold-cavity 20. Each of the molding assemblies 16a, b further includes a drive mechanism 24a, b, respectively, for conveying the respective mold segments 22a, b along a path as shown. Each of the mold segments 22a, b are affixed to a respective one of the drive mechanisms 24a, b with a predetermined alignment to continuously form the respective portion of dynamic mold-cavity 20 as the mold segments 22a, b are conveyed along their respective paths.

Such paths can take any desired form, e.g., linear, such that they operate in reciprocal fashion. In the presently-illustrated embodiment, such paths are circuitous. Thus, the drive mechanisms 24a, b for each of the respective molding assemblies 16a, b may each comprise an endless belt driven about a circuit. For molding assembly 16a, such circuit may be defined by a pair of spaced-apart, rotary end-members 26a, b, between which and around which the endless-belt-type drive mechanism 24a is driven about its circuitous path, as shown in FIG. 1. Similarly, for molding assembly 16b, the circuitous path for its endless-belt-type drive mechanism 24b may be defined by spaced-apart, rotary end-members 28a, b, as also shown in FIG. 1. The molding assemblies 16a, b may thus counter-rotate relative to one another, such that the respective mold segments 22a, b converge at an entrance point 30 for movable mold 18, and then diverge at an exit point 32 for the movable mold (FIGS. 1-2). In this manner, the two portions, e.g., halves, of the dynamic mold-cavity 20 contributed by each of the molding assemblies 16a, b converge as the respective mold segments 22a, b are assembled into the respective mold-cavity portions, thereby also forming, at the same time, the movable mold 18 and causing it to move in the direction of arrow 34 as shown in FIG. 2, with the completed dynamic mold-cavity 20 therein.

The endless-belt-type drive mechanisms 24a, b may include a continuous chain, belt, cable, etc., as the means by which the components of each drive mechanism are linked together and driven along their circuitous path. In the illustrated embodiment, chains are used for this purpose. Thus, as shown in FIGS. 2-3, drive mechanism 24a for mold assembly 16a may include a pair of chains 36a, b, while drive mechanism 24b for mold assembly 16b may include a pair of chains 38a, b. Each of the spaced-apart, rotary end-members 26a, b may be in the form of a pair of drive gears (only one gear, 26a, shown in FIG. 2), which engage chains 36a, b to both guide and drive them around the circuit within molding assembly 16a. Similarly, each of the spaced-apart, rotary end-members 28a, b may be in the form of a pair of drive gears (only one gear, 28a, shown in FIG. 2), which engage chains 38a, b to both guide and drive them around the circuit within molding assembly 16b.

Suitable drive means 40a, b, shown in FIG. 1 and schematically represented in FIG. 2 as "M," may be used in conjunction with respective drive mechanisms 24a, b to drive the rotation thereof about their respective circuits in molding assemblies 16a, b. As shown, drive means 40a may be operatively associated with rotary end-member 26a and drive means 40b may be operatively associated with rotary end-member 28a. Drive means 40a, b may be any suitable device for providing rotational force, e.g., a pneumatic, hydraulic, or electric motor, which may be mechanically linked to respective rotary end-members 26a and 28a.

Figure 5:
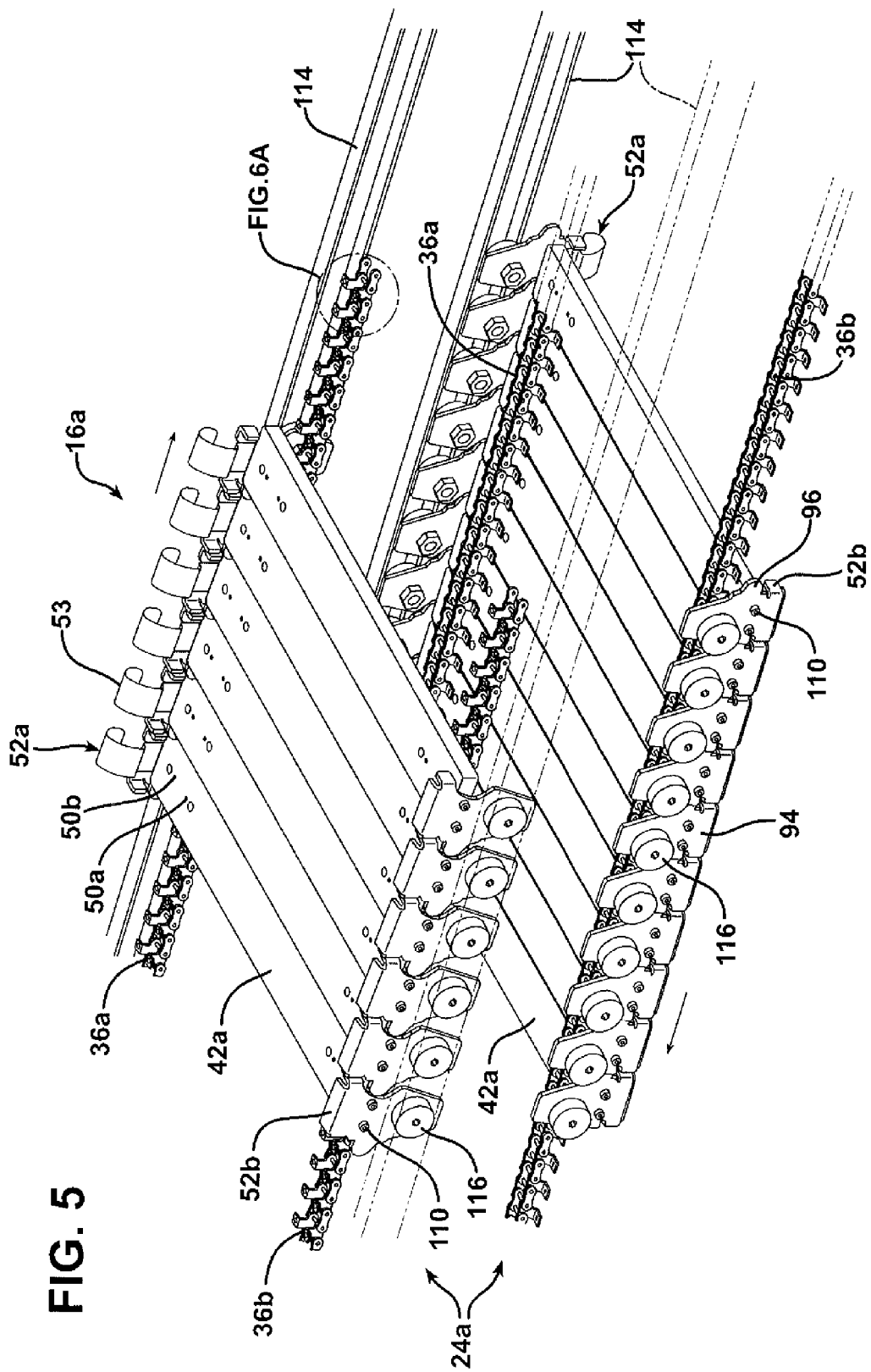
FIG. 5 is a perspective view of portions of the apparatus shown in FIG. 1, from which the mold segments have been omitted for clarity.
Figure 6:
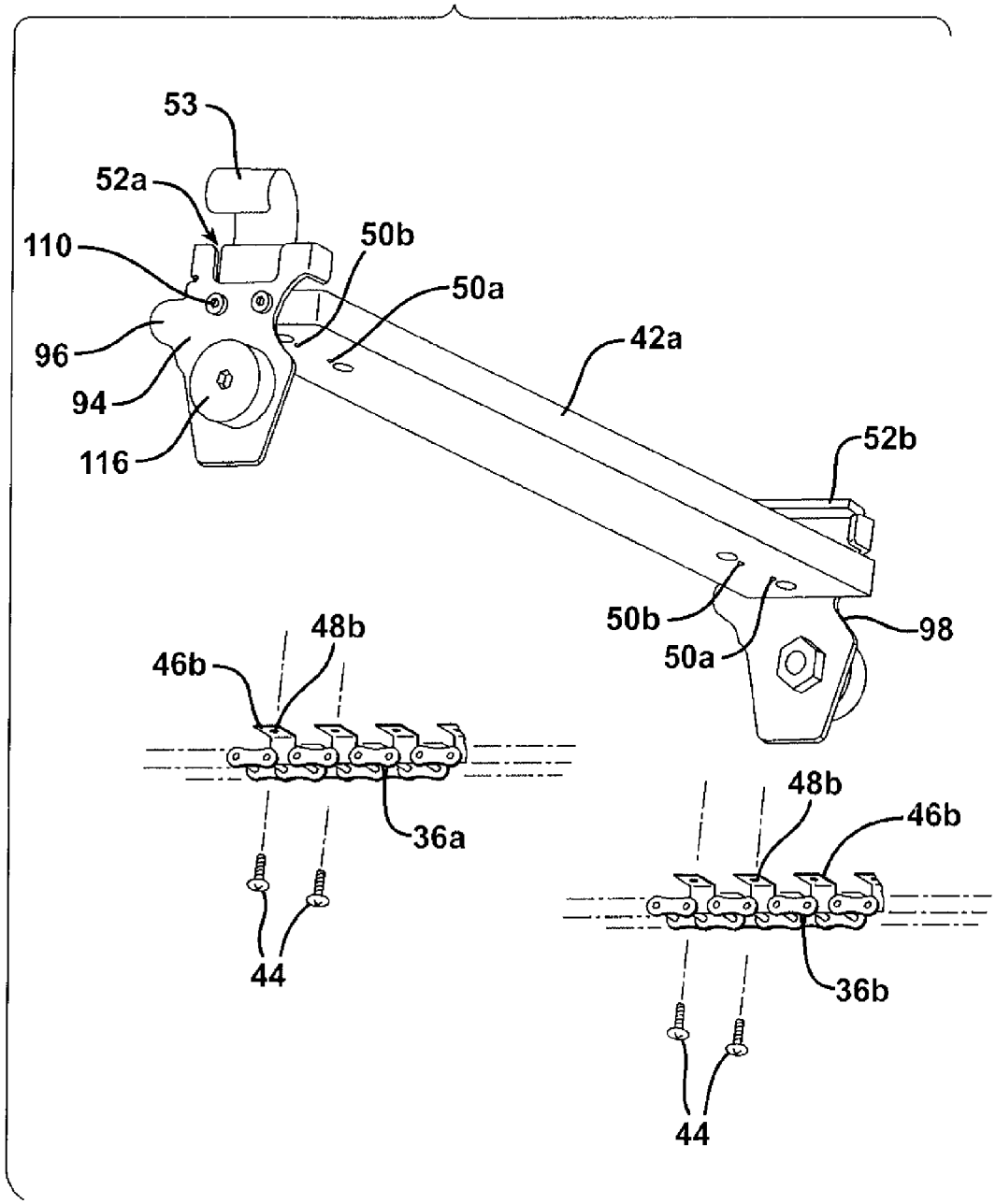
FIG. 6 is an exploded perspective view of portions of the apparatus as shown in FIG. 5.

With continuing reference to FIGS. 2-3, but now with additional reference to FIGS. 5-6, it may be seen that drive mechanisms 24a, b may each further include a plurality of respective slats 42a, b. The slats 42a, b may be attached to respective belts, e.g., chains, 36a, b and 38a, b, such that the driven movement of the chains 36, 38, e.g., as described above, conveys the slats 42a, b about the circuit for each of the respective molding assemblies 16a, b. Attachment of the chains to the slats may be effected via suitable fasteners 44 as shown, e.g., screws, bolts, clips, etc. Alternatively, the slats and chains may be permanently attached together at mounting tabs 46, e.g., via welding, gluing, etc.

Figure 6A:
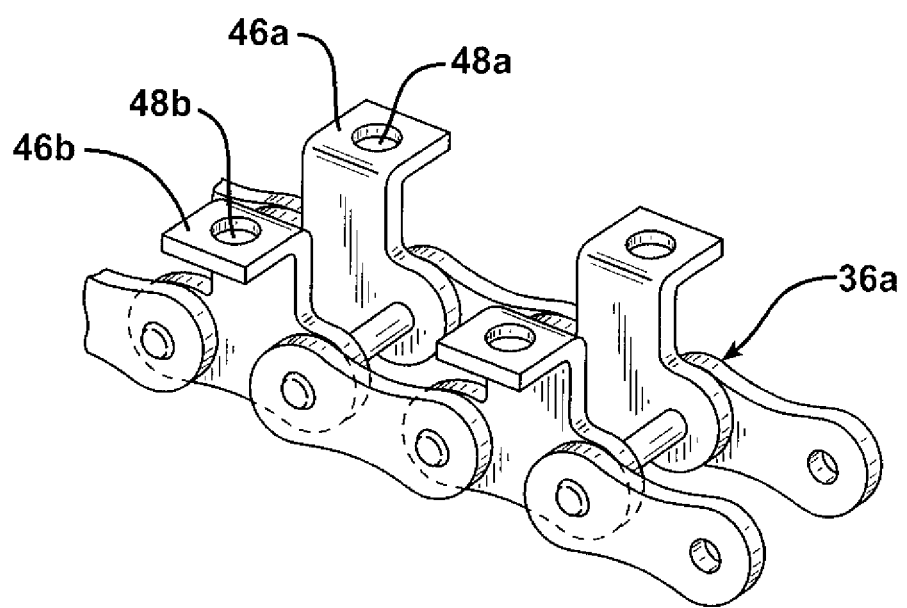
FIG. 6A is an expanded view of a portion of the apparatus as indicated in FIG. 5.

FIG. 5 is a partial perspective view of molding assembly 16a, from which the mold segments 22a have been removed in order to better show the drive mechanism 24a thereof. FIG. 6 is an exploded perspective view of one of the slats 42a thereof and associated chains 36a, b, and FIG. 6A is a partial perspective view of chain 36a at the section thereof as indicated in FIG. 5. As illustrated, each of the chains 36a, b may have a plurality of spaced-apart pairs of mounting tabs 46a, b, with holes 48a, b that align with paired mounting holes 50a, b in slats 42a, which allow fasteners 44 to attach the chains 36a, b to the slats 42a, as shown perhaps most clearly in FIGS. 5-6. Slats 42b in molding assembly 16b may affixed to chains 38a, b in the same or a similar manner.

One or more fastener devices 52, e.g., 52a and 52b, may be affixed to each of the slats 42a, b for both respective molding assemblies 16a, b. Such fastener devices 52 may be adapted to secure one or more of the mold segments 22a, b to each of the respective slats 42a, b, as shown perhaps most clearly in FIG. 3, wherein the devices 52a, b are positioned at each end of the slats 42a, b to secure mold segments 22a, b thereon and between the two fastener devices 52a, b. If desired, one of the devices, e.g., 52a, may include a quick-release, e.g., resiliently-biased, clip 53, so that that the mold segments 22 may be installed on and removed from slats 42 without the need for tools, making mold changes relatively quick and simple to accomplish. In the illustrated embodiment, the mold segments 22a, b each include a pair of 'feet' 54a, b, which cooperate with, e.g., fit into, respective fastener devices 52a, b, so as to hold the mold segments in place on slats 42 as shown.

Referring now to FIGS. 1-2, it may be seen that apparatus 10 further includes a dispenser 56 for dispensing a moldable, expandable material 58 into dynamic mold-cavity 20, e.g., at entrance 30 for the movable mold 18 as shown. When the mold 18 is made to move by drive mechanisms 24a, b, such moldable material travels through the dynamic mold-cavity 20 and emerges therefrom at exit 32 to form a continuous molded article 12, e.g., a continuous series of molded articles, which may subsequently be separated into individual articles 14.

Moldable, expandable material 58 dispensed by dispenser 56 may be a foamable polyurethane composition, e.g., from a reactive mixture of a polyol, supplied to the dispenser by hose 60a, and an isocyanate, supplied to the dispenser by hose 60b. Such dispensers are well-known in the art, particularly those which mix polyols and isocyanates as component fluids to form polyurethane foam, which then expands and hardens within bags or other containers to form packaging cushions. See, e.g., U.S. Pat. Nos. 5,186,905, 5,950,875, 6,617,367, 6,675,557, 6,811,059, and 6,929,193, the disclosures of which are incorporated herein by reference thereto, in their entirety.

Apparatus 10 may also include a film-feeding mechanism 62 for feeding one or more films, e.g., a single, center-folded film 64 as illustrated, from a source 66 thereof and into the dynamic mold cavity 20, such that the film(s) 64 are interposed between the moldable material 58 and the molding assemblies 16a, b. Such arrangement is particularly advantageous when material 58 is a foamable polyurethane composition, which tends to be rather sticky. The film 64 prevents unwanted adhesion between the material 58 and mold segments 22. The film 64 may be supplied, e.g., as a center-folded film as illustrated or as a pair of juxtaposed films, from a roll 66 as shown. The film-feeding mechanism 62 may include at least one sealing/film-drive device 68 for sealing the film(s), e.g., a longitudinal edge-seal device, and engaging and pulling the film from roll 66. When film 64 is a center-folded film with one open longitudinal edge 70 as shown, only one edge-seal device 68 is needed to close the open longitudinal edge 70, e.g., with a continuous longitudinal seal 72, beginning at a point just downstream of dispenser 56. As shown, this arrangement allows dispenser 56 to be inserted into the center-folded film 64 as it dispenses the moldable material 58 therein. Sealing device 68 may include a pair of counter-rotating drive rollers 69a, b as shown, which form longitudinal seal 72 therebetween, e.g., via a suitable heat-seal unit (not shown), such as a heated wire or the like. The counter-rotating rollers 69a, b can also serve the function of pulling film 64 from roll 66, and feeding the same into entrance 30 of moving mold 18, wherein the counter-rotating molding assemblies 16a, b then take over the function of pulling the film through the moving mold 18.

Further details concerning the dispenser 56, film-feed mechanism 62, and sealing device 68, as well as many alternative arrangements, are described in the above-incorporated patents in the Background section hereof, and any such dispensing/film-feeding arrangements may be employed with molding apparatus 10. Unlike such arrangements, however, the dispensing/film-feeding arrangement employed with the present invention need not include a transverse sealing/severing device for making seals and cuts across the width of the film, which otherwise form discrete bags in which the foamable composition is contained. Instead, molding apparatus 10 makes a continuous molded article 12, e.g., continuous series of molded articles 14, with the film 64 and moldable material 58 being continuously fed into the moving mold 18 and dynamic mold cavity 20 thereof, such that the molded article 12 continuously emerges from the cavity 20 at exit 32, as shown in FIG. 1.

Thus, a method for making a continuous molded article 12 includes providing molding assemblies 16a, b, each of which comprises a respective series of movable mold segments 22a, b, which are adapted to fit together to form a portion, e.g., half, of dynamic mold-cavity 20. The movable mold segments 22a, b of each of the molding assemblies 16a, b are conveyed along the, e.g., circuitous, path shown in FIG. 1, and with a predetermined alignment, to continuously form each of the respective portions, e.g., halves, of the dynamic mold-cavity 20.

Figure 4:
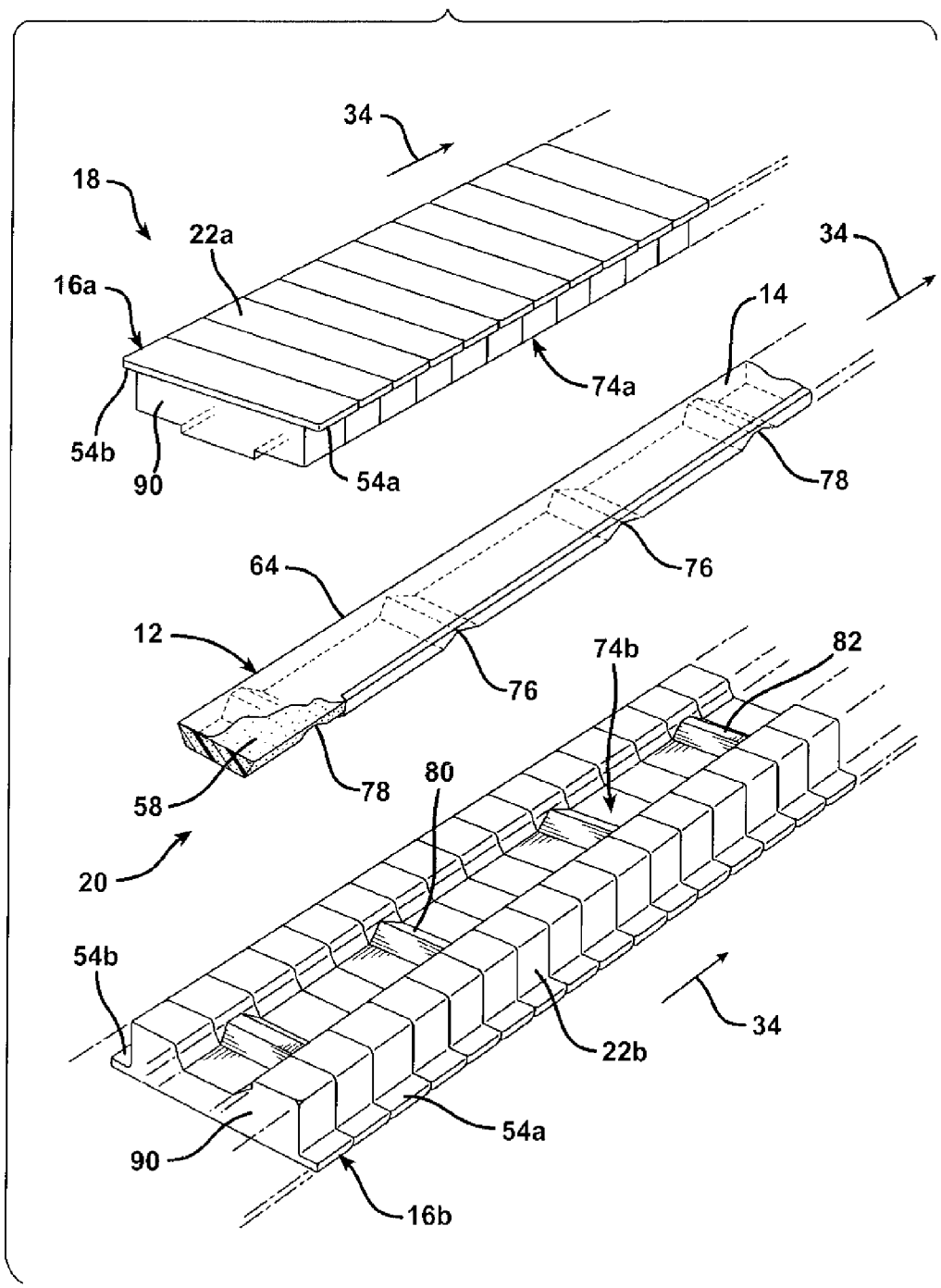
FIG. 4 is an exploded perspective view of portions of the apparatus shown in FIG. 1.

This is perhaps best shown in FIG. 4, which is an exploded, partial perspective view of the movable mold 18 with continuous molded article 12 therein, as they are together being conveyed in direction 34, such that the movable mold 18 becomes moving mold 18 (details of the drive mechanisms 24a, b have been omitted for clarity). When mold segments 22a are aligned as shown in moving mold 18, i.e., in close, e.g., contacting, proximity to one another, together they form portion 74a of dynamic mold-cavity 20. Similarly, when mold segments 22b are aligned as shown in moving mold 18, together they form portion 74b of dynamic mold-cavity 20. Each portion 74a, b of dynamic mold-cavity 20 forms substantially continuous, unbroken interior 'mold-half' surfaces, which, when brought together as shown in FIG. 3, form the dynamic mold-cavity 20. The term "mold-half," as used herein, is not meant to imply that molding assembly 16a and 16b must each contribute precisely one half of the interior surface area of dynamic mold-cavity 20. Instead, the term is more generally used to refer to the fact that each of the molding assemblies 16a, b contribute a portion of the dynamic mold-cavity 20, regardless of the precise proportion that each assembly provides. Thus, for example, the portion 74a contributed by molding assembly 16a could provide one-fourth of the total surface area of dynamic mold-cavity 20, while the portion 74b from molding assembly 16b could provide three-fourths of such total surface area.

FIGS. 3A-3D are partial, cross-sectional views of moving mold 18 from FIG. 2, taken at progressively downstream locations beginning at entrance 30 to the mold, and show the convergence of the mold-cavity portions 74a, b of each of the molding assemblies 16a, b, which thereby generates the moving mold 18 with dynamic mold-cavity 20 therein. As may be appreciated by viewing FIG. 2 in conjunction with FIGS. 3A-3D, the convergence of the mold-cavity portions 74a, b may occur substantially contemporaneously with, or shortly after, the formation of such mold-cavity portions, which generally occurs at entrance 30 of moving mold 18, and results from the fitting together of the mold-segments 22a, b in their predetermined alignment as the respective portions of dynamic mold-cavity 20. Thus, unlike static mold-cavities, e.g., as described in some of the above-incorporated patents, mold-cavity 20 in accordance with the present invention is "dynamic," in that it, via the mold-cavity portions 74a, b, are continuously assembled at entrance 30 and disassembled at exit 32, with the continuous molded article 12 being continuously formed within the mold-cavity 20 in dynamic, moving fashion between the entrance 30 and exits points 32 of moving mold 18.

Figure 3A:
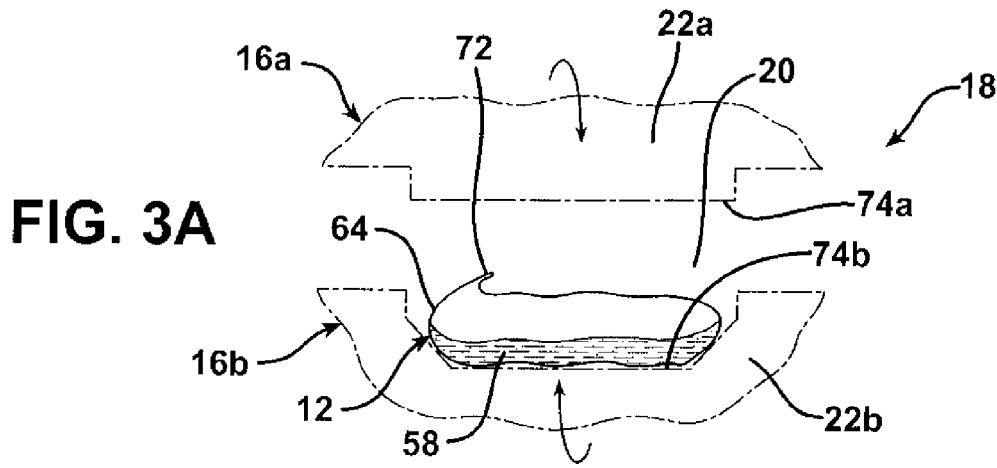
FIGS. 3A-3D are partial cross-sectional views similar to FIG. 3, but taken at various positions forward of that in shown in FIG. 3.
Figure 3B:
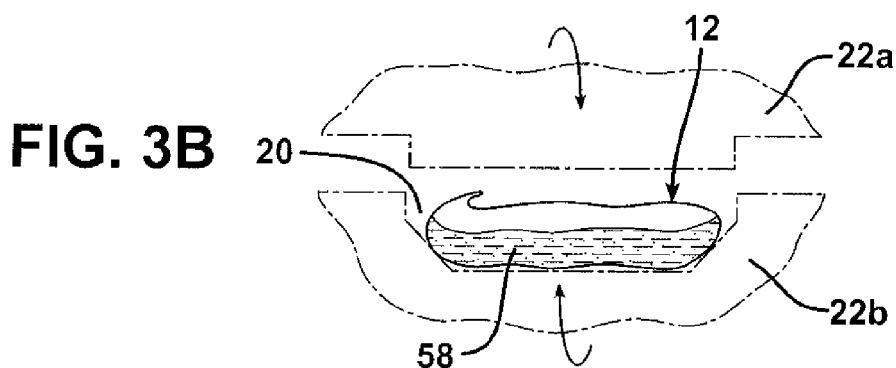
Figure 3C:
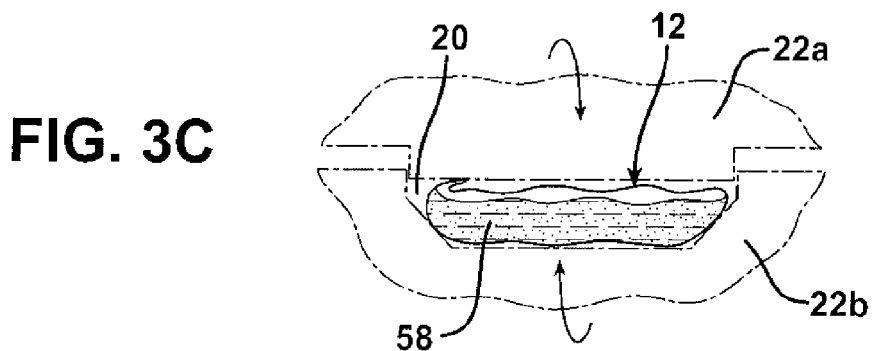
Figure 3D:
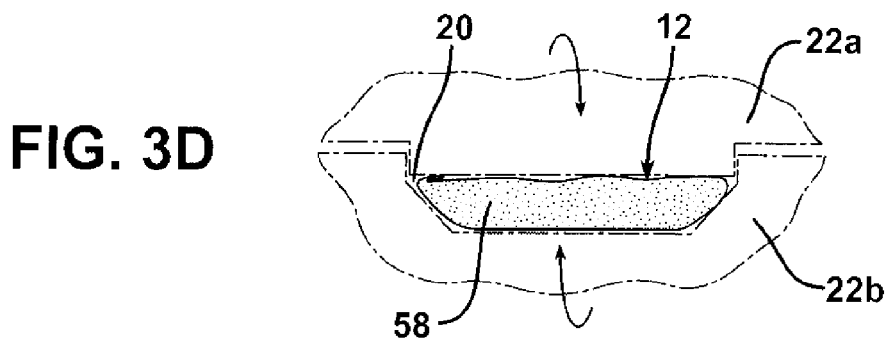

As the moldable, expandable material 58 is dispensed into dynamic mold-cavity 20, it begins to expand within the dynamic mold-cavity, and continues to expand, at the same time that the mold-cavity portions 74a, b of each of the molding assemblies 16a, b converge, as shown progressively in FIGS. 3A, 3B, 3C, then 3D, resulting in an ever-decreasing volume in mold-cavity 20, until the final volume is reached, which is shown cross-sectionally in FIG. 3. As may be appreciated, the expansion of the material 58 within the dynamic mold-cavity 20 as the volume thereof decreases results in a force being exerted on the mold segments 22a, b as they are conveyed along the path of the moving mold 18 between the entrance and exit points 30, 32 thereof. As will be described in further detail below, in such circumstance, one or more directional components of the force from the expanding material 58 have a tendency to cause the mold segments 22a, b to deviate from their predetermined and desired alignment as mold-cavity portions 74a, b for dynamic mold-cavity 20. If left uncorrected, such deviations can result in the shape-distortion of mold-cavity 20, and therefore of molded articles 14, or, worse, a shut-down of apparatus 10 due to mold segments 22a and/or b becoming fully or partially detached from drive mechanism 24a and/or b.

When corrected in accordance the present invention (discussed below), however, a continuous molded article 12 with a desired shape can be continuously produced, i.e., formed and hardened into a permanent molded-shape within dynamic mold-cavity 20 during the conveyance of such article 12 between the entrance and exit points 30, 32 of moving mold 18, part of the progression of which is shown in FIG. 4.

Figure 7A:
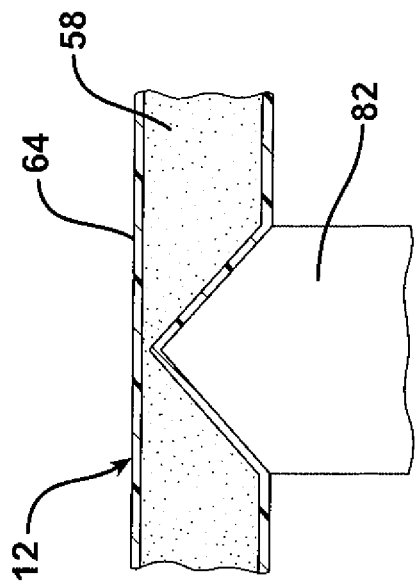
FIGS. 7A and 7B are expanded elevational views of portions of the apparatus and continuous molded article as shown in FIG. 4.
Figure 7B:
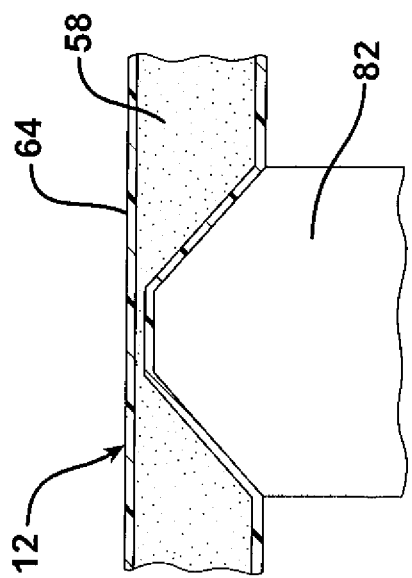
Figure 8:
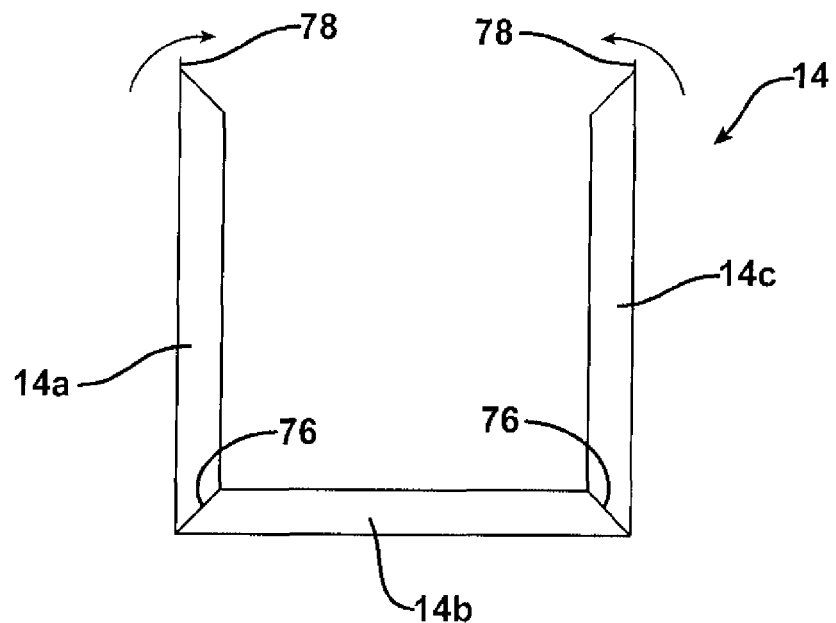
FIGS. 8 and 8A are elevational views of separated molded articles produced by the apparatus shown in FIG. 1.

The continuous molded article 12 can have any desired shape and can be produced in continuous fashion as described above. The final form that the molded article 12 will assume will depend on the predetermined size, shape, and configuration of, as well as the spacing between, the mold-cavity portions 74a, b. In the illustrated embodiment, the continuous molded article 12 has a generally trapezoidal cross-sectional shape, with bendable hinge-regions 76 and separation-regions 78 (FIGS. 4, 7, and 8). Thus, one or more of the mold segments 22a and/or b may be adapted to form the bendable hinge-regions 76, and one or more may similarly be adapted to form the separation-regions 78 in continuous molded article 12. In the illustrated example, some of the mold segments 22b have wedge-shaped hinge-protrusions 80 (FIG. 7B) while some have mesa-shaped separation-protrusions 82 (FIG. 7A). Molding apparatus 10 may thus further include a cutting mechanism 84, e.g., including cutting blades 86a, b, for cutting the continuous molded article 12, e.g., at separation regions 78, so as to separate individual molded articles 14 from the continuous series 12 thereof (FIG. 1). Thus, as illustrated in FIG. 8, each resultant separated article 14 may include three sections 14a, 14b, and 14c, which may be relatively bendably movable at bend regions 76. In this manner, for example, the three sections 14a-c may be configured as shown to form three sides of cube or box-like structure. Another similarly-configured article 14 can be inverted, mated with, and attached to the article shown in FIG. 8 to form a six-sided packaging container.

Figure 8A:
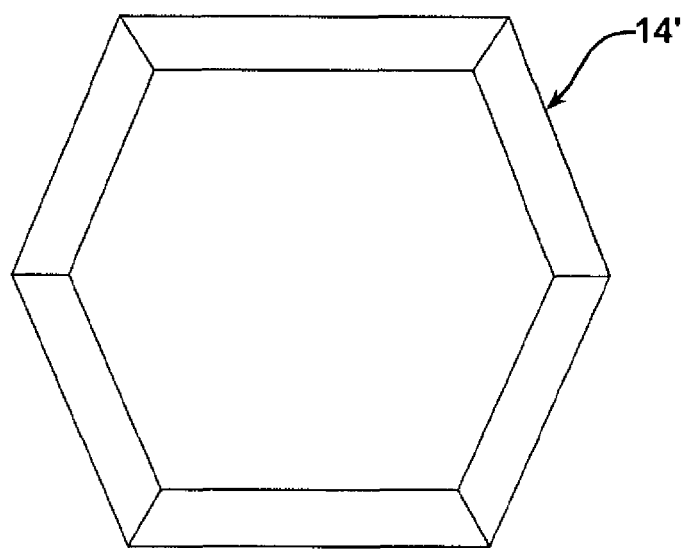

Many other shapes and configurations are, of course, possible, with the continuous molded article 12 merely being an illustrated example. For instance, while wedge-shaped protrusions 80 are adapted to form 90-degree bend regions 76, such protrusions could also be adapted to form 60-degree bend regions, resulting in the hexagonal-shaped configuration shown in FIG. 8A.

As noted above, the expansion of material 58 within dynamic mold-cavity 20, as the volume thereof decreases and then reaches a fixed, final volume (FIGS. 3 and 3A-3D), results in various forces being exerted on the mold segments 22a, b as they are conveyed along the path of the moving mold 18 between the entrance and exit points 30, 32 thereof. Such forces are generally directed outwards from expanding material 58 and against the mold-cavity portions 74a, b of the dynamic mold-cavity 20.

FIG. 9 is an isolated view of the mold segments 22b of molding assembly 16b, as they are being conveyed along the path of the movable/moving mold 18 in direction 34, i.e., in the region of convergence of 'upper' and 'lower' molding assemblies 16a, b between entrance and exit points 30, 32 of the moving mold 18. As illustrated in FIG. 9, one or more directional components 88a, b of the forces from the expanding material 58, e.g., those that are directed longitudinally, i.e., parallel to direction 34, in moving mold 18, have a tendency to cause the mold segments 22b to deviate from their predetermined and desired alignment as mold-cavity portion 74b for dynamic mold-cavity 20. Similar tendencies towards deviation occur relative to mold segments 22a/mold-cavity portion 74a. A desired predetermined alignment is as shown in FIGS. 2 and 4, i.e., with the mold segments substantially perpendicular to the drive mechanism to which they are attached, such that adjacent mold segments are butted against one another with the abutment surfaces 90 of adjacent mold segments 22a, b in full, or nearly full, contact with one another. In this manner, the mold-cavity portions 74a, b provide substantially continuous and unbroken mold-half surfaces, and thus maintain the integrity of dynamic mold-cavity 20 during the moving molding process. On the other hand, when the mold segments 22 deviate from their predetermined alignment, e.g., due to longitudinally-directed forces 88a, b as illustrated in FIG. 9, gaps 92 can form between adjacent mold segments, as the abutment surfaces 90 thereof move out of contact with one another. If left uncorrected, such deviations can result in the shape-distortion of mold-cavity 20, and therefore of molded articles 14, or, worse, a shut-down of apparatus 10 due to mold segments 22a and/or b becoming fully or partially detached from drive mechanism 24a and/or b.

In accordance with the present invention, each of the molding assemblies 16a, b include one or more alignment-correction devices 94, which urge the respective mold segments 22a, b towards their predetermined alignment in the event that the mold segments deviate therefrom during their conveyance in direction 34 along the path of the moving mold 18. In other words, the alignment-correction devices 94 provide the function of responding to any deviations of the mold segments 22a, b from their predetermined alignment, by urging the mold segments to return towards such predetermined alignment when/as they deviate therefrom. In this manner, the integrity of the dynamic mold-cavity 20 is preserved, despite the dynamic nature of the mold and the disruptive tendency of forces 88a, b from expanding material 58 being molded therein.

With continuing reference to FIG. 9, it may be seen that the molding assemblies 16 may include a series of the alignment-correction devices 94, and that each of the alignment-correction devices 94 may be separately associated with each of the mold segments 22. The alignment-correction devices 94 may thus effect the urging of the mold segments 22 towards their predetermined alignment via physical contact with adjacent alignment-correction devices, e.g., by being shaped to facilitate such urging of mold segments towards their predetermined alignment and, e.g., by being pivotally movable. Thus, for example, each alignment-correction device 94 may include a convex portion 96, a concave portion 98, and a pivot point 100.

Additional reference will now be made to FIG. 10, which is a magnified view of the alignment-correction members 94 in FIG. 9, as indicated therein. As illustrated, the alignment-correction devices 94 may be pivotally movable, e.g., at pivot points 100, such that physical contact between adjacent alignment-correction devices 94 occurs via pivotal movement of one or more of the devices 94 as shown. Further, the alignment-correction devices 94 may be configured such that contact between the convex 96 and concave 98 portions of adjacent alignment-correction devices 94 may effect the urging of mold segments 22 towards their predetermined alignment.

Thus, for example, pivotal movement of one of alignment-correction device 94b in a first direction 102 urges pivotal movement of at least one adjacent alignment-correction device, e.g., device 94a, in a second direction 104. As may be seen, first direction 102 is counter-clockwise while second direction 104 is clockwise. Thus, as device 94b begins to rotate about pivot point 100 in first direction 102, i.e., due to force 88b acting on the mold segment 22b associated with device 94b, the concave portion 98 of device 94b engages the convex portion 96 of device 94a, causing it to pivot about its pivot point 100 in second direction 104. The relative shapes and positioning of the concave portion 98 of device 94b and the convex portion 96 of device 94a causes device 94a to pivot in second direction 104, which is against the direction of pivot of device 94b, i.e., first direction 102. In this example, the upper part 99 of concave portion 98 of device 94b contacts the upper part 97 of the convex portion 96 of device 94a, as device 94b pivots counter-clockwise in first direction 102. This exerts a downward, clockwise force upon the convex portion 96 of device 94a, which thus pivots, or at least attempts to pivot, about its pivot point 100 in second, clockwise direction 104. Such counter-pivoting of adjacent device 94a in second direction 104 thus resists, e.g., urges against, the undesirable pivoting of device 94b in first direction 102 due to force 88b. In this manner, alignment-correction device 94a thus urges at least the mold segment 22b associated therewith and with device 94b towards their predetermined alignment (FIGS. 2 and 4) in response to the deviation therefrom (pivotal movement of device 94b and the mold segment 22b associated therewith in first direction 102) due to directional component 88b of the force of expansion of material 58 acting on the mold segment 22b associated with device 94b.

With continuing reference to FIG. 10, it may be observed that the pivot of device 94b in first direction 102 causes the convex portion 96 of device 94b to engage the concave portion 98 of adjacent device 94c, which urges device 94c to pivot in second direction 104, again, due to the relative shapes and positioning of the concave portion 98 of device 94c and the convex portion 96 of device 94b. Due to inertia, device 94c and the mold segment 22b associated therewith will resist such movement in second direction 104, which thus serves to further urge against the undesirable pivot 102 of device 94b (i.e., in addition to the counter-urging of device 94a) due to force 88b that, in this example, is acting on the mold segment 22b associated with device 94b in a localized manner due to expansion of expandable, moldable material 58 in dynamic mold-cavity 20.

As further indicated in FIG. 10, force component 88a is acting upon the mold segment 22b associated with alignment-correction device 94d, and causing the mold segment and device 94d to pivot in second direction 104. Such pivot will cause the lower part 106 of the concave portion 98 of device 94d to come into contact with the lower part 108 of convex portion 96 of adjacent device 94c, thereby exerting an upward, counter-clockwise force on the device 94c, which will urge it to pivot in first direction 102, which is counter to both the pivot direction 104 of device 94d (caused by force 88a) and the direction 104 in which device 94b is urging device 94c to pivot. Device 94c will thus urge against the pivot direction 104 of device 94d as caused by force 88a. Further, the pivot of device 94d in direction 104 will cause the convex portion 96 of device 94d to engage the concave portion 98 of adjacent device 94e, which will urge the device 94e to counter-pivot in direction 102, thereby providing further resistance against the deviation of the mold segment 22b associated with device 94d from the desired predetermined alignment of the mold segments, and thus act to close the temporary gap 92 that formed between adjacent mold segments associated with the devices 94c, d due to force component 88a.

Accordingly, in the illustrated embodiment, it may be seen that the alignment-correction devices 94 thus function in a reactive, cooperative, and self-correcting manner to continuously urge the mold segments to return to their predetermined and desired alignment, as shown FIGS. 2 and 4, to thereby provide structural integrity to dynamic mold-cavity 20. When the mold segments are properly in their predetermined alignment, the alignment-correction devices 94 may be structured such that substantially no contact occurs between adjacent devices, e.g., with contact occurring only once a deviation from such alignment occurs of sufficient magnitude that the convex and concave portions of adjacent devices 94 are caused to come into contact with one another, e.g., via pivotal movement as illustrated.

As noted above, one or more of the alignment-correction devices 94 may be associated with each of the mold segments 22a, b. Thus, for example, one or more of the alignment-correction devices 94 may be attached to each of the slats 42a, b. For instance, as illustrated in the embodiment shown in FIG. 5, a pair of alignment-correction devices 94 may be attached to each slat 42a, b, e.g., via fasteners 110, with one device 94 at either end of each slat 42 as shown.

Apparatus 10 may further include a frame 112 for supporting the molding assemblies 16a, b (FIG. 1), with such frame including a guide track 114 (FIG. 5). A portion of the alignment-correction devices 94 may ride in the guide track 114 as the slats 42a, b are conveyed about the circuit for each molding assembly 16a, b. The alignment-correction devices 94 may include one or more bearings 116, which ride inside the guide track 114 and also provide pivot point 100. In this manner, the alignment-correction devices 94 may move both pivotally (FIG. 10) and translationally (FIG. 5) within the guide track 114.

Figure 12:
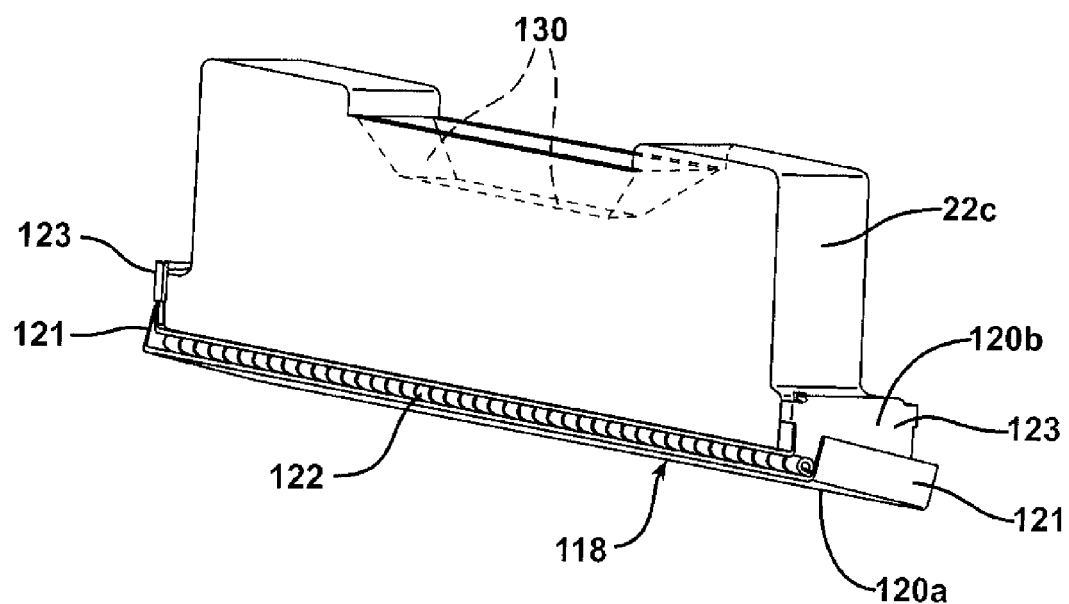
FIG. 12 is a partially-assembled view of the embodiment shown in FIG. 11.
Figure 13:
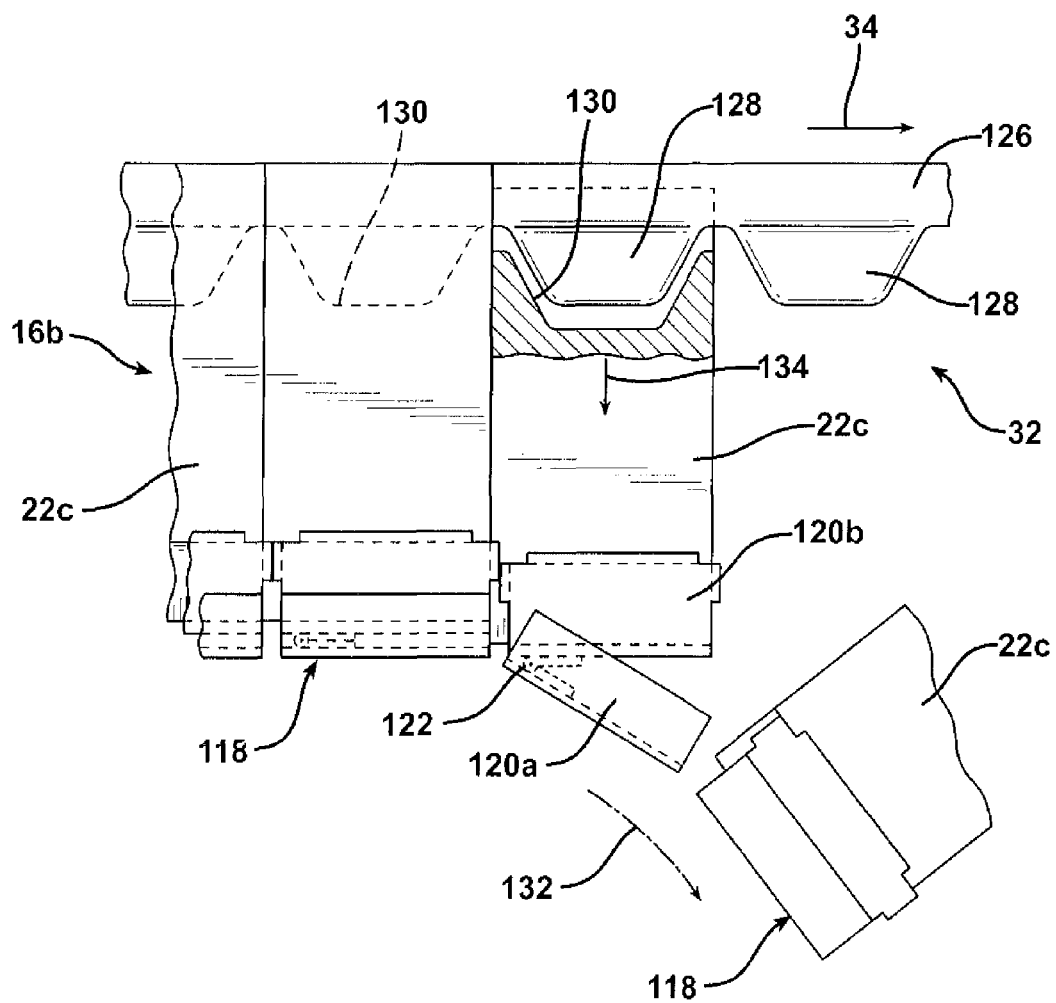
FIG. 13 is a partial elevational view of the device shown in FIGS. 11-12 as employed in the apparatus shown in FIG. 1.

Referring now to FIGS. 11-13, another feature of the invention will be described, wherein at least one of the mold segments 22 may be pivotally affixed to the respective drive mechanism 24a, b. To this end, a pivotal member 118 may be attached to one or more of the mold segments 22. In the illustrated example, the mold segment 22c has a deeper and steeper mold-half surface profile 130 than that of the previously-illustrated mold segments 22a, b. Pivotal member 118 may have first and second base elements 120a, b, which are pivotally joined to one another by a hinge 122. The base element 120a of the pivotable member 118 is adapted to be secured to the relevant drive mechanism 24a, b, e.g., via tabs 121, which fit into fastener devices 52a, b on slats 42a, b as shown, while the base element 120b may be secured to the relevant mold segment 22 (22c in this example). As illustrated, mold segment 22c may be secured to base element 120b via brackets 123 thereon and a fastener, e.g., screw, 124, secured through one or both brackets 123 and into the feet 54a, b of mold segment 22c which, as shown, are of a shape and size to fit into brackets 123. In this manner, the mold segment 22a, b, or c to which pivotal member 118 is attached may be pivotally affixed to drive mechanism 24a and/or b.

Figure 19:
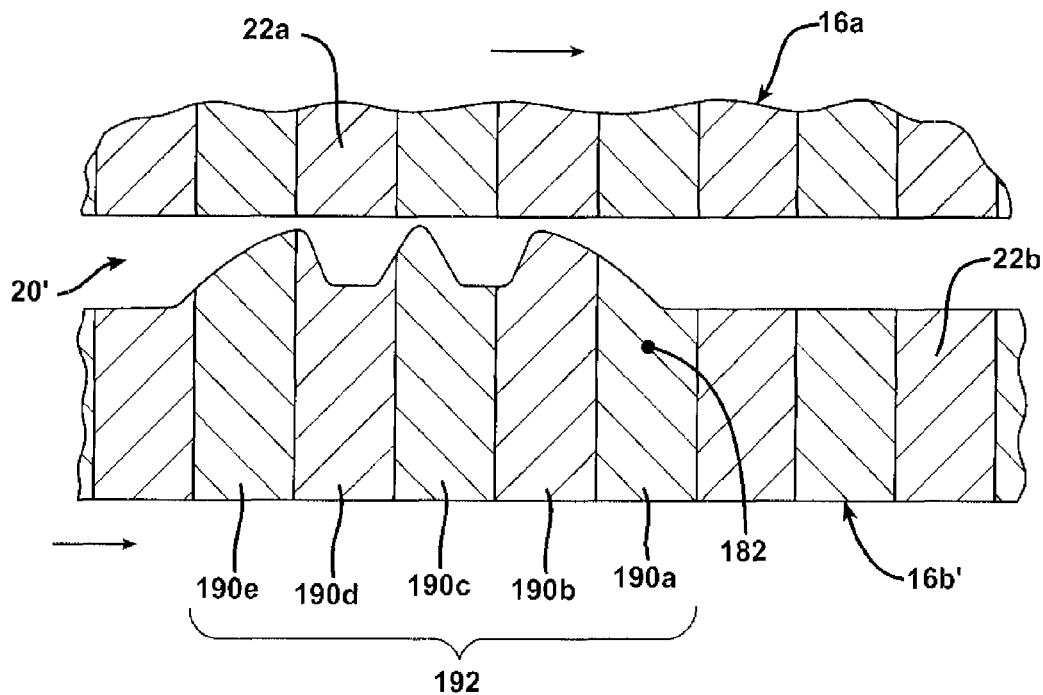
FIG. 19 is a partial, cross-sectional view of an alternative mold segment configuration in accordance with an embodiment of the invention.

Pivotally affixing a mold segment to drive mechanism 24a and/or b may be advantageous when the mold-half surface provided by a particular mold segment, or a contiguous group thereof, has a deep and/or steep profile 130 as illustrated in mold segment 22c, such that the release of the mold segment from the resultant continuous molded article would be difficult at exit 32 of moving mold 18. This is illustrated in FIG. 19, wherein mold segments 22c are part of lower molding assembly 16b, and are at the exit point 32 of the moving mold 18, having traveled in direction 34 thereof. As shown, the continuous molded article 126 has downward protrusions 128 therein, as produced by a deep-profile portion of the mold-half surface 130 of the mold segment 22c. At the point of release of mold segments 22c from the molded article 126 at rotary end-member 28b, the mold segments 22c would otherwise release tangentially from the molded article 126, as the path of travel of the mold segments becomes a curve 132 due to the rotary traversal about the rotary end-member 28b. Due to the downward protrusions 128 and deep-profile of the mold-half surface 130 of the mold segment 22c, such tangential release would be impeded due to physical hindrance between the protrusions 128 and deep-profile 130 of the mold segments 22c at the point of the tangential transition.

However, the inventors hereof have found that by including pivotal member 118, the mold segment 22c is able to release substantially vertically from molded article 126 at the point of tangential transition, as indicated by arrow 134, so that the protrusions 128 and deep-profile 130 separate in a substantially linear fashion at such transition point, whereby no physical hindrance occurs and a clean release is possible. After release, the mold segments 22c can pivot forward and assume their normal/predetermined alignment on the drive mechanism 24b, with base elements 120a, b being in contact with one another, until the next time that such mold segment reaches the exit point 32 of the moving mold 18 to again release from the molded article 126. In this regard, a magnet or the like may be employed on one of the contacting surfaces of the base elements 120a, b to facilitate holding the base elements together during their transit about the circuit of the molding assembly 16b.

Figure 14:
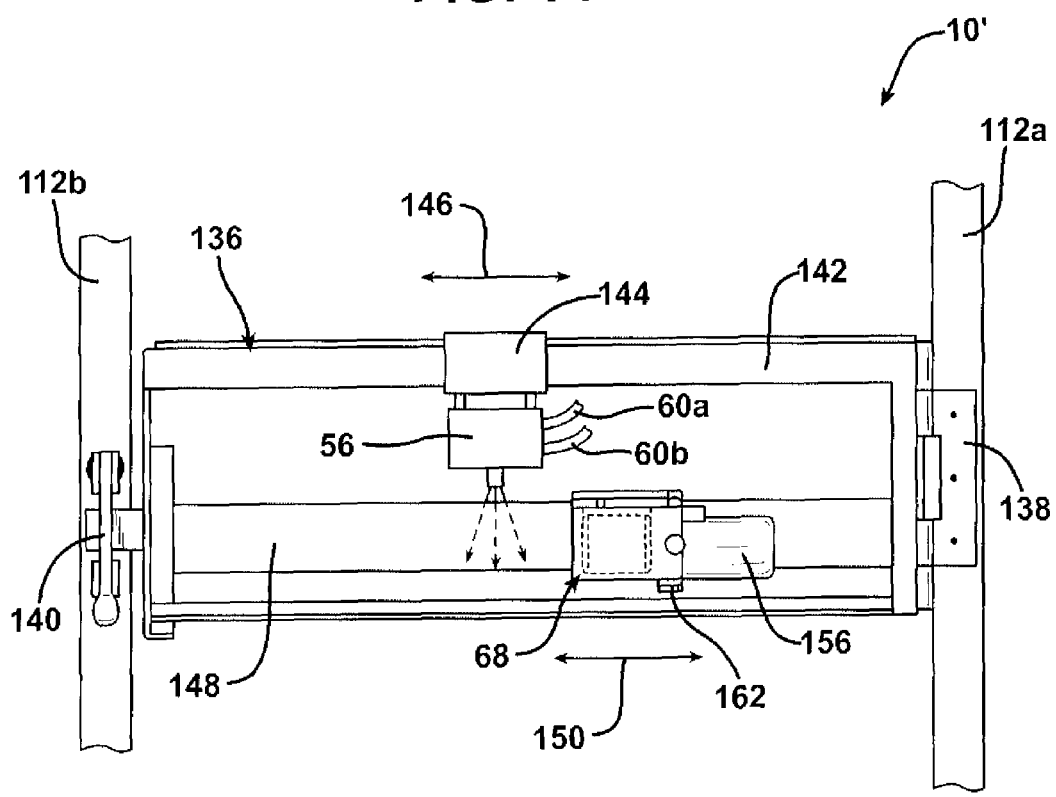
FIG. 14 is an elevational view of a portion of the apparatus shown in FIG. 1, illustrating alternative embodiments in accordance with the invention.
Figure 15:
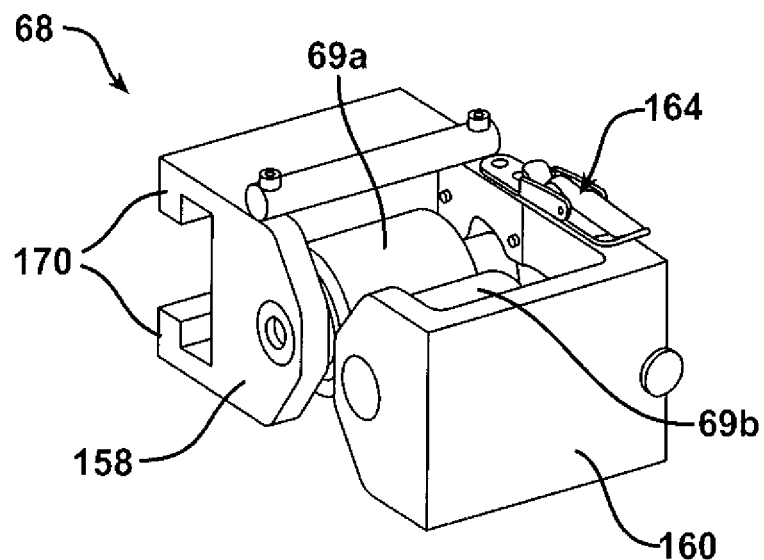
FIGS. 15-16 are perspective views of one of the components shown in FIG. 14.
Figure 16:
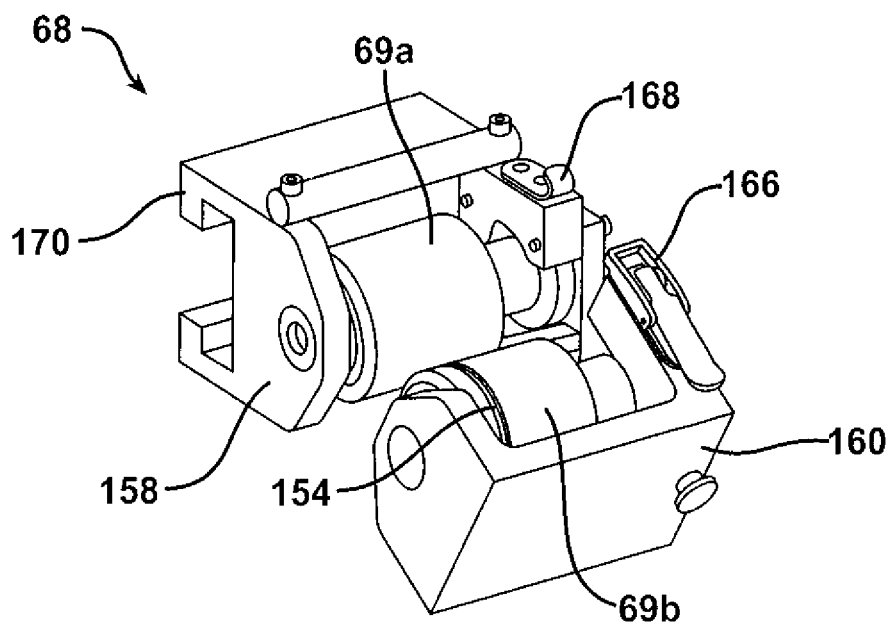

Referring now to FIGS. 14-16, a further feature of the invention will be described. As noted above, and illustrated in FIGS. 1-2, apparatus 10 includes a dispenser 56 for dispensing moldable, expandable material 58 into dynamic mold-cavity 20, e.g., at entrance 30 for the movable mold 18 as shown. Apparatus 10 may also include a film-feeding mechanism 62 for interposing film 64 between the foamable composition 58 and the molding assemblies 16a, b. The film-feeding mechanism 62 may include at least one sealing/film-drive device 68, e.g, a longitudinal edge-seal device, to close the single (center-folded film) or both (two juxtaposed films) open longitudinal film edge(s) with at least one longitudinal seal 72. The sealing device 68 may include a pair of counter-rotating rollers 69a, b, which form the longitudinal seal 72 therebetween, and also pull the film 64 from roll 66 and feed the same into entrance 30 of moving mold 18, wherein the counter-rotating molding assemblies 16a, b then take over the function of pulling the film through the moving mold 18.

In many instances, it is beneficial to mount dispenser 56 such that it is movably positionable, e.g., pivotally and/or translationally, with respect to molding assemblies 16a, b. Thus, as shown with respect to alternative apparatus 10' in FIG. 14, dispenser 56 may be mounted on swing bracket 136, which may be pivotally attached to frame member 112a via hinge mechanism 138. A latch mechanism 140 may also be provided to secure the swing bracket in a 'closed position,' as shown, e.g., to an opposing part of the frame at frame member 112b. By being mounted to swing bracket 136, dispenser 56 may thus be pivotally movable relative to molding assemblies 16a, b. This allows for ease of access to the molding assemblies, e.g., for maintenance or to change mold segments (to provide a differently shaped molded article), by pivotally moving the dispenser 56 to an 'open position' (not shown), i.e., by opening the latch mechanism 140 and pivoting the swing bracket 136 away from the molding assemblies on hinge mechanism 138 to fully expose the entrance 30 of the movable mold 18.

The dispenser 56 can also, or instead, be made translationally movable with respect to molding assemblies 16a, b, by mounting it on slide bar 142 via slide mount 144. This allows the dispenser to be positioned at any desired location across the width of the molding assemblies 16a, b, i.e., anywhere between frame members 112a and 112b as shown, by sliding the dispenser along slide bar 142 in either of the directions indicated by bi-directional arrow 146. When mold segments 22 are changed, the shape of the dynamic mold-cavity 22 defined therebetween will be changed, and thus the ability to inject the foam at different positions, e.g., to coincide with the widest or deepest part of the mold-cavity, by simply sliding the dispenser 56 along the slide bar 142 to the optimal location, is a highly beneficial feature to the practice of making continuous molded articles in accordance with the present invention.

Similarly, when mold segments 22 are changed, the width of film 64 can change to suit the particular size/shape of the resultant dynamic mold-cavity 20. Thus, being able to seal the film at variable positions across the width of the molding assemblies 16a, b would also be highly beneficial. This may be accomplished in accordance with the present invention by mounting sealing device 68 such that it is movably positionable with respect to the molding assemblies 16a, b, e.g., by mounting it to slide bar 148 as shown, which allows it to be positioned at any desired location across the width of the molding assemblies 16a, b, i.e., anywhere between frame members 112a and 112b as shown, by sliding the sealing device 68 along slide bar 148 in either of the directions indicated by bi-directional arrow 150.

With reference to FIGS. 14-16, it may be seen that sealing/film-drive device 68 may also be movably positionable with respect to molding assemblies 16a, b in a pivotally-movable manner, e.g., between closed (FIG. 15) and open (FIG. 16) positions as shown. As noted above, device 68 may include a pair of counter-rotating drive rollers 69a, b. A heat-seal wire 154 may be associated, e.g., with roller 69b as shown, to make the continuous longitudinal seal 72 as the juxtaposed film plies in film 64 are brought into continuous, moving contact therewith. Power may be supplied to the heat-seal wire 154 via a slip ring or the like (not shown), which may be positioned on one end of the roller 69b to direct electrical power to the wire through electronic components located inside the roller. If desired, e.g., to prevent adhesion between the wire 154 and film 64, the wire may be covered with a non-stick material, such as a strip of polytetrafluoroethylene (PTFE). A drive motor 156 may be included (FIG. 14) in order to drive the rotation of one of the rollers 69a, b, e.g., roller 69a, so that roller 69a is directly driven and roller 69b is indirectly driven (by roller 69a). In this manner, the film 64 can be withdrawn from roll 66 by feeding it, e.g., an edge portion, between the nip formed by the driving convergence of the counter-rotating rollers 69a, b. Feeding of the film may be facilitated by moving the sealing device 68 to the open position shown in FIG. 16, wherein the rollers 69a, b are separated from one another with a space therebetween. Roller 69a may thus be mounted in housing 158 while roller 69b may be mounted in separate housing 160. As shown, housings 158, 160 may be movably, e.g., pivotally, connected to one another, via hinge 162 (FIG. 14). Once an edge of film 64 has been placed between the rollers 69a, b, e.g., upon replacing spent film roll 66 with a full roll, the rollers can be brought back into driving contact with one another, with film 64 pressed therebetween, by moving the sealing device 68 to the closed position shown in FIG. 15. A latch mechanism 164 may be provided to maintain the rollers in the closed position (FIG. 15), e.g., with latch 166 on housing 160 and catch 168 on housing 158 (FIG. 16). Further, mounting bracket 170 may be included, e.g., on housing 158, in order to provide a slidable mount for the device 68 on slide bar 148 as described above.

With reference back to FIG. 1, another feature of the invention will be described. Apparatus 10 may further include a controller 172 and a sensor 174 as shown. Controller 172 may, e.g., be mounted to frame 112, and may be included in apparatus 10 for controlling at least one of: drive mechanism 24a for molding assembly 16a; drive mechanism 24b for molding assembly 16b; dispenser 56; and film-feeding mechanism 62.

Figure 18:
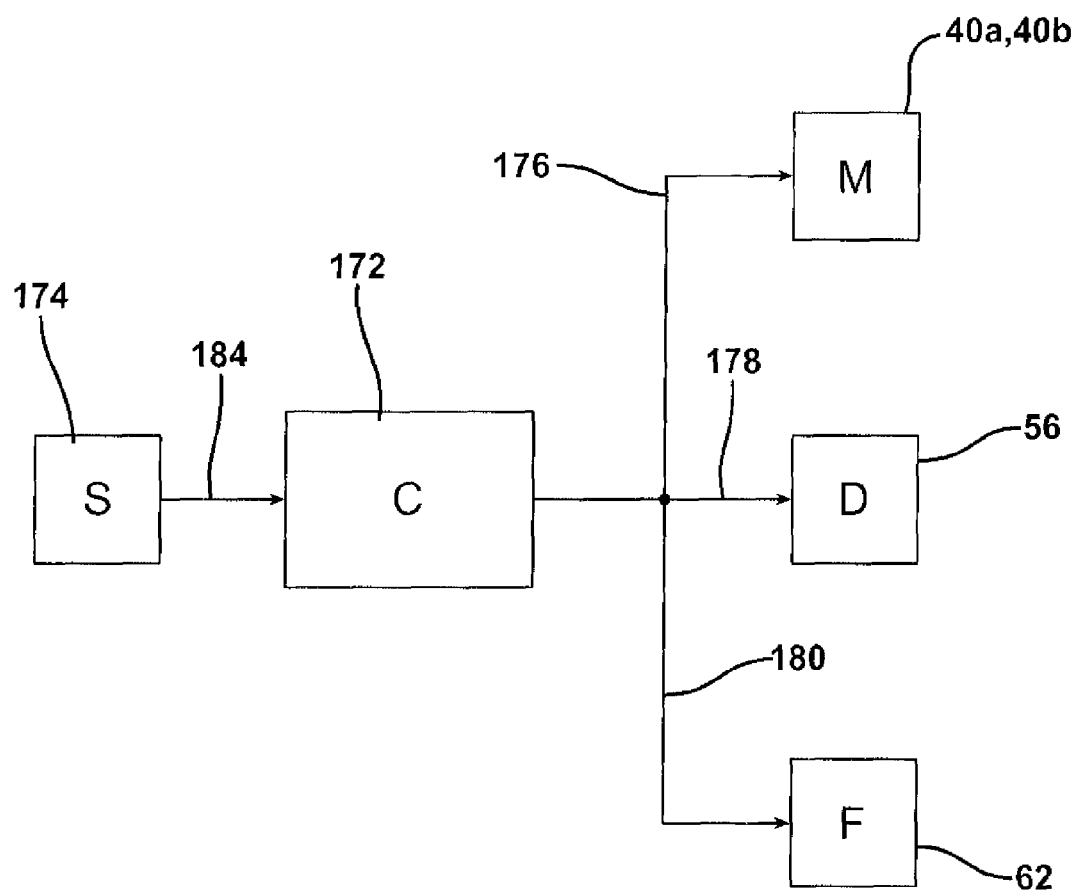
FIG. 18 is a schematic view of a control diagram for the apparatus shown in FIG. 1.

In order to control the drive mechanisms 24a, b, controller 172 may be in operative, e.g., electrical, communication with respective drive means, e.g., motors, 40a, b, as represented schematically in FIG. 18, wherein controller 172 is labeled as "C" and drive means 40a, b are labeled as "M". In this manner, the speed at which drive means 40a, b conveys mold segments 22a, b may be determined by the output 176 from controller 172 to drive means 40a, b. For example, if drive means 40a, b are embodied by electric motors, output 176 may be electrical current, and controller 172 may vary such current in proportion to the desired speed of conveyance of mold segments 22a, b, wherein the output/current 176 flows through and thereby supplies power to the motors 40a, b, either directly from the controller 172, or indirectly, e.g., via a variable-current (or variable-voltage) 'gate' device, such as a transistor. Drive mechanisms 24a, b may thus convey respective mold segments 22a, b along the respective paths shown in FIG. 1 at a controlled rate, i.e., as determined by controller 172.

Similarly, controller 172 may be in operative communication with dispenser 56 via output 178 (FIG. 18), e.g., in the form of a variable electrical current that flows directly or indirectly to pumps (not shown) that supply fluid to the dispenser via hoses 60a and/or 60b (FIG. 2). In this manner, controller 172 may cause dispenser 56 to dispense the moldable material 58 into the dynamic mold-cavity 20 at a controlled rate.

Likewise, controller 172 may be in operative communication with film-feeding mechanism 62 via output 180 (FIG. 18), e.g., in the form of a variable electrical current that flows directly or indirectly to film-drive/sealing device 68, such as to drive motor 156 thereof in the embodiment shown in FIGS. 14-16. In this fashion, controller 172 may cause film-feeding mechanism 62 to feed film(s) 64 into dynamic mold-cavity 20 at a controlled rate.

Figure 17:
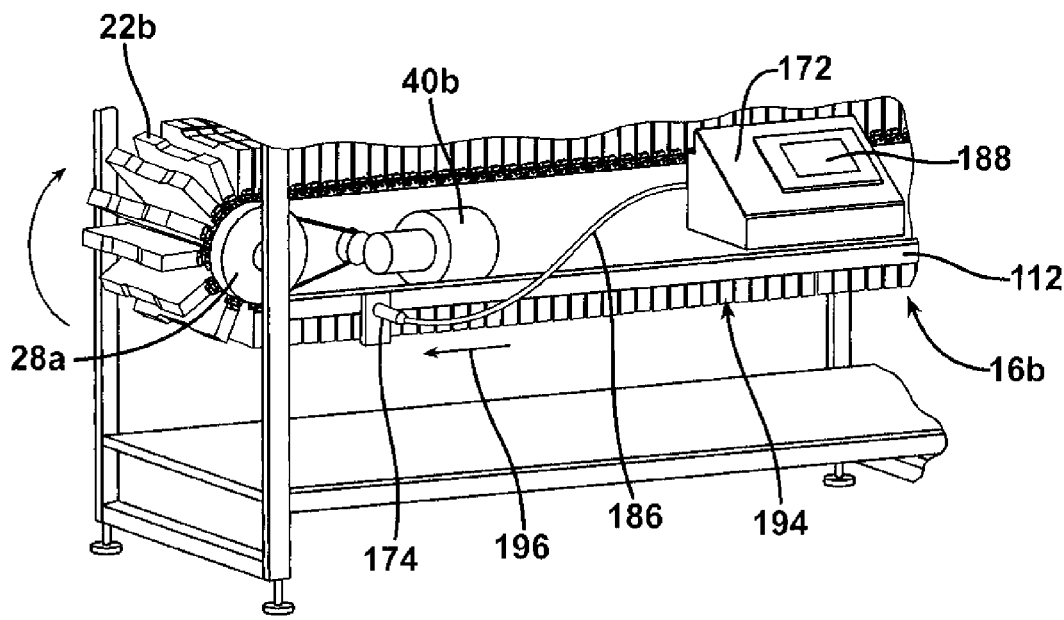
FIG. 17 is an expanded perspective view of the apparatus shown in FIG. 1.
Figure 17A:
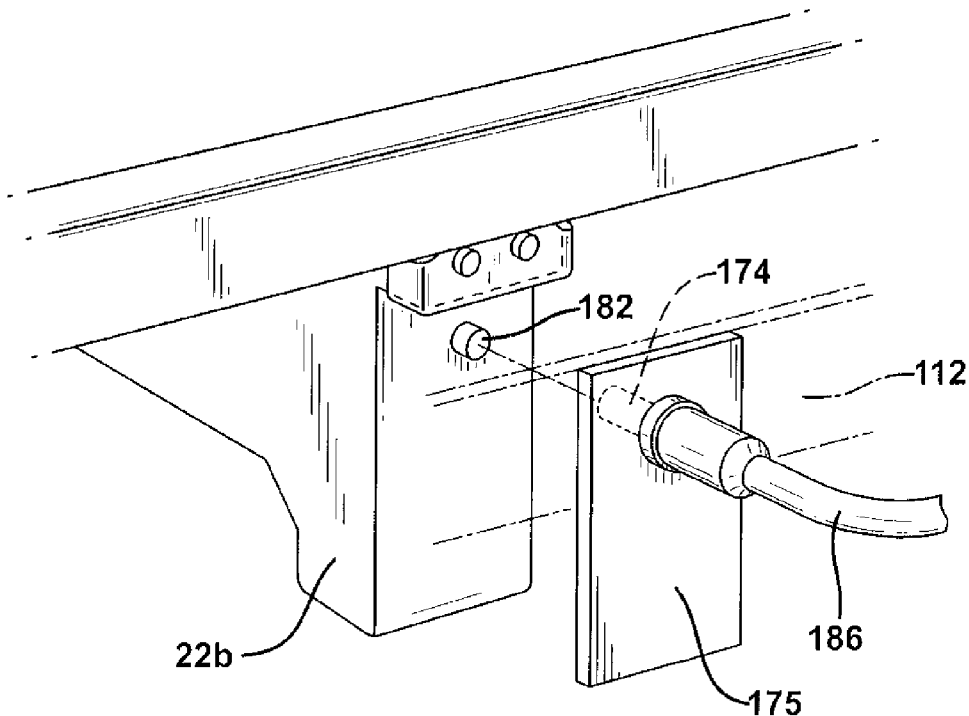
FIG. 17A is a further expanded perspective view of the apparatus shown in FIG. 17.

As shown in FIGS. 17 and 17A, sensor 174 may be positioned on molding apparatus 10, e.g., by mounting the sensor to frame 112 via mounting plate 175 as shown. An indicator 182 may be associated with one or more of the mold segments 22a, b. In the illustrated embodiment, indicator 182 is associated with one of the mold segments 22b from molding assembly 16b, which is identified as mold segment 22b' in FIG. 17A. As also shown, sensor 174 is positioned on molding apparatus 10 in such a way as to detect the presence of indicator 182. In accordance with the presently-illustrated embodiment, sensor 174 is operative to send a signal 184 (FIG. 18), e.g., via wire or cable 186, to controller 172 upon detecting the presence of indicator 182 at a predetermined location on apparatus 10. Detection of the indicator 182 when it arrives at a predetermined location on apparatus 10 may be accomplished based on, e.g., the position of sensor 174 on apparatus 10, the detection range of sensor 174, the manner in which the indicator 182 is associated with the mold segment, etc. Controller 172 may, in turn, be made operative (e.g., via programming), upon receipt of signal 184 from sensor 174, to change the rate of at least one of 1) the conveyance of mold segments 22a and/or b by respective drive mechanisms 24a and/or b; 2) the dispensation of the moldable material 58 by dispenser 56; and 3) the feeding of film(s) 64 by film-feed mechanism 62.

The association of indicator 182 with one of the mold segments 22 may be effected by direct attachment of the indicator to the mold segment, e.g., as shown in FIG. 17A, wherein indicator 182 is attached directly to mold segment 22b'. Alternatively, an indicator 182 may be associated with a mold segment by being attached to the respective drive mechanism 24a, b in proximity to the desired mold segment, e.g., via attachment to the relevant slat 42, fastener device 52, alignment-correction device 94, etc.

Sensor 174 may detect the presence of indicator 182 in any conventional manner, including optical detection (e.g., via 'machine vision' recognition by sensor 174 of indicator 182); electromagnetic detection (inductive or capacitive sensing, e.g., wherein indicator 182 comprises metal, such as when embodied by a bolt or screw); physical detection (e.g., via physical contact between sensor 174 and indicator 182), etc.

Controller 172 may be in the form of a printed circuit assembly, e.g., a printed circuit board (PCB), and include a control unit, e.g., an electronic controller, such as a microcontroller, which stores pre-programmed operating codes; a programmable logic controller (PLC); a programmable automation controller (PAC); a personal computer (PC); or other such control device which is capable of receiving both operator commands and electronic, sensor-generated inputs, and carrying out predetermined, e.g., pre-programmed, operations based on such commands and inputs. Commands may be supplied to the controller via an operator interface 188 or the like, or may be supplied remotely, e.g., via wired or wireless communication devices.

In accordance with the presently-described embodiment, controller 172 may be adapted to automatically control the operation of apparatus 10, including changing the rate of the conveyance of the mold segments 22, dispensation of the moldable material 58, feeding of the film(s) 64, etc., upon the occurrence of certain predetermined events, including detecting the presence of an indicator 182 by sensor 174. For example, the controller 172 may be adapted, e.g., pre-programmed, to operate in a plurality of modes such that, for each such mode, the receipt of signal 184 from sensor 174 results in a predetermined response from the controller. Such response, e.g., a command via output 176, 178, and/or 180 to drive means 40, dispenser 56 and/or film-feed mechanism 62, respectively, may extend, e.g., for a predetermined interval or, e.g., until another input, e.g., signal 184, is received, e.g., from another indicator 182 and/or from another sensor 174 positioned at another location on apparatus 10.

As an example, there may be applications in which the dynamic mold-cavity 20 is non-uniform, i.e., it changes shape, due to the presence of differently-shaped mold segments 22, e.g., which are positioned intermittently in one or both molding assemblies 16a, b. This results in molded cushions, or a series of molded cushions, having a variable shape, e.g., in order to form custom-shaped cushions for packaging objects that have a particular shape.

For instance, the mold segments 22 may be arranged in molding assembly 16a and/or 16b in such a way that a region of increased surface area is intermittently produced within the resultant dynamic mold cavity 20, resulting in the intermittent need for an increase in the amount of film needed to cover such region, relative to other regions of the mold cavity. An example of this is shown in FIG. 19, wherein higher-profile mold segments 190*a-e* are included as a group with the 'normal' mold segments 22*b* in molding assembly 16*b*', thereby creating a region 192 of the resultant dynamic mold cavity 20' having a greater surface area than other regions, e.g., the remainder, of the dynamic mold cavity 20'. When region 192 forms at entrance 30 of the moving mold 18, a relative increase in the feeding of film 64 is needed in order to present enough film to fully follow the contour of the region 192, e.g., without resulting in a 'bridging' of the 'peaks' formed by mold segments 190*b-e*, and thereby producing an incompletely-formed cushion which does not conform to the contour of the object to be packaged. Once the high-surface-area region 192 moves deeper into the dynamic mold cavity 20', the temporary relative increase in the film-feed would desirably end, so that a 'normal' film-feed rate resumes, i.e., one that provides a sufficient amount of film to cover the lower-profile of the mold cavity 20' outside of region 192, without providing excess film, which would waste film and result in a wrinkled cushion appearance.

The foregoing temporary relative increase in the rate at which film is fed into the dynamic mold cavity 20' may be achieved by either increasing the film-feed rate, decreasing the mold-segment-conveyance rate, or both. Then, once region 192 has been supplied with the requisite amount of film and has moved deeper into the dynamic mold cavity 20', the previous film-feed and/or conveyance rates may be restored. This temporary change may be effected automatically in accordance with the presently-described embodiment of the present invention, e.g., by programming controller 172 such that, upon receipt of signal 184 from sensor 174, controller effects at least one of 1) an increase in the rate of film feeding by film-feed mechanism 62 and/or 2) a decrease in the rate of mold-segment conveyance by drive mechanisms 24*a, b*, e.g., via respective drive means 40*a, b*. Thus, for example, indicator 182 may be associated with, e.g., attached to, mold segment 190*a*, which is the leading mold segment of high surface-area-region 192, as shown in FIG. 19. Further, sensor 174 may be positioned on apparatus 10 as shown in FIGS. 1 and 17, i.e., on frame 112 adjacent the return leg 194 of mold segments 22*b* on lower molding assembly 16*b*, traveling in return direction 196. When positioned as such, sensor 174 detects indicator 182 on mold segment 190*a* at the end of such mold segment's traverse of return leg 194, and thus just prior to the passage of the mold-segment sub-assembly 190*a-e* around rotary end-member 28*a* and then entrance into movable mold 18 at entrance point 30. Once sensor 174 has detected indicator 182 at such location, it generates and sends signal 184 to controller 172. Upon receipt of signal 184, controller sends output 176 to drive means 40*a, b*, to command the drive means 40*a, b* to decrease the rate of mold-segment conveyance, and/or sends output 180 to film-feed mechanism 62, to command the mechanism 62 to increase the rate of film feeding. In this manner, by the time that the mold segments 190*a-e* have completed their traversal around rotary end-member 28*a*, entered the moving mold 18 at 30, and assembled into high-surface-area region 192 in dynamic mold cavity 20' as shown in the FIG. 19, a relatively increased quantity of film 64 from film-feed mechanism 62 will have arrived at region 192 in time to properly conform to the contour thereof.

In accordance with the foregoing embodiment, it may thus be appreciated how sensor 174 may be made operative to send signal 184 to controller 172 upon detecting the presence of indicator 182, e.g., at the illustrated location on apparatus 10, in order for the controller to automatically control the operation of apparatus 10, e.g., via predetermined changes in the rate of mold-segment conveyance, moldable-material dispensation, and/or film feeding. Based on the description herein, those of ordinary skill in the art of setting up, programming, operating and/or servicing foam-in-bag cushion machines will readily be able to make the necessary adjustments to apparatus 10, e.g., the placement and detection range for sensor 174; the association, e.g., placement, of indicator 182 relative to a designated mold segment; the 'normal' rates of mold-segment conveyance, moldable-material dispensation, and film feeding; the altered or changed rates of mold-segment conveyance, moldable-material dispensation, and/or film feeding; etc., to enable acceptable performance for a wide variety of desired cushion-making applications. Thus, for example, if it were determined that, at normal operational speeds, it takes two seconds for mold segment 190*a* to reach entrance 30 of movable mold 18 after the indicator 182 thereon is detected by sensor 174, controller 172 could be programmed to slow the rate of mold-segment conveyance (via output 176) two seconds after receiving signal 184 from sensor 174. This would allow a relatively increased rate of film feeding, and therefore increased film coverage, for the high surface-area-region 192 of dynamic mold cavity 20'. The extent of such decrease in the mold-segment conveyance rate to obtain a desired degree of increased film coverage can readily be determined, e.g., through a few trial-and-error iterations (initially based, e.g., on the percentage increase in surface area per lineal distance in region 192 relative to that of the other regions of the mold cavity), and then programmed into controller 172.

In those embodiments in which controller 172 operates in a plurality of modes, the foregoing may be considered a first one of said modes. If apparatus 10 is reconfigured to produce a molded article or series of molded articles having a different shape than those produced from the apparatus 10 when operating in the first mode, i.e., when the mold segments 22 are replaced with one or more differently-shaped mold segments resulting in a dynamic mold-cavity that is different in shape than dynamic mold-cavity 20,' the controller may be commanded by the operator, e.g., via operator interface 188, to operate in a second mode, i.e., in which the controller is pre-programmed to send different outputs 176, 178, and 180, when sensor 174 sends signal 184 to the controller. Such pre-programmed new outputs 176-180 in the second operational mode will be based on the particular film-coverage and moldable-material-volume needs of the cushion(s) being produced in the second mode.

Figure 20:
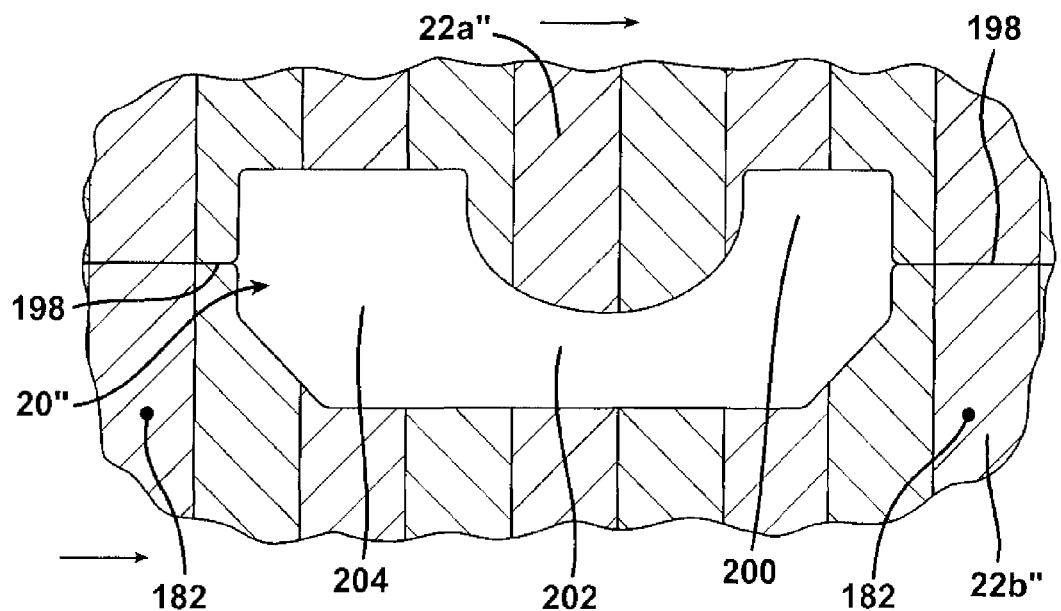
FIG. 20 is a partial, cross-sectional view of another alternative mold segment configuration in accordance with a further embodiment of the invention.
Figure 21:
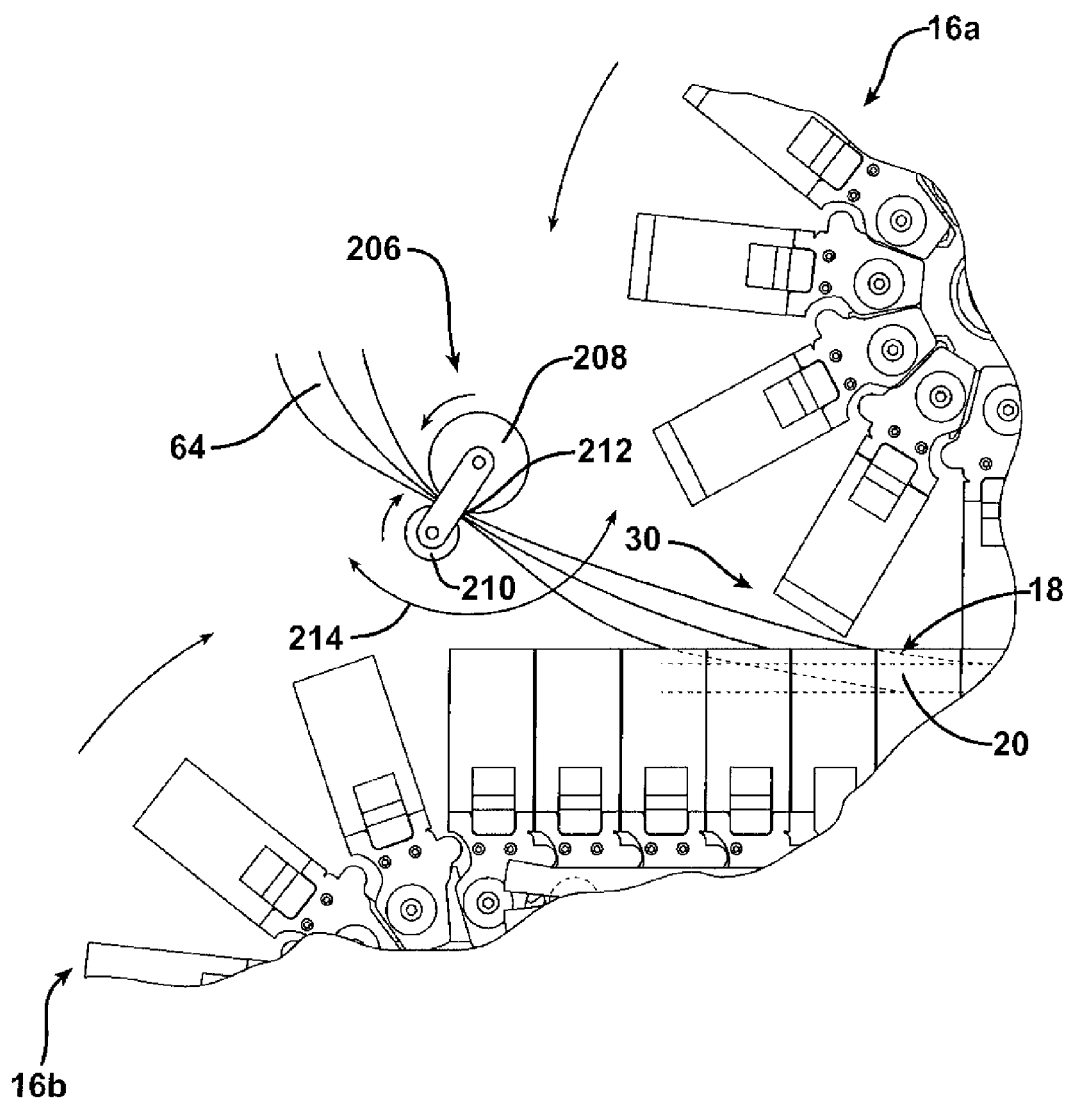
FIG. 21 is an expanded elevational view of the apparatus shown in FIG. 2.

For example, in some mold-segment configurations of apparatus 10, the volume of the dynamic mold-cavity will intermittently increase, such that more moldable material is required for a given length of the mold-cavity relative to other regions thereof. An illustration of this is shown in FIG. 20, in which mold segments 22*a*" and 22*b*" may be configured as dynamic mold 20" to produce a continuous series of molded articles having the illustrated shapes, i.e., with intermittent regions 198 wherein no moldable material 58 is needed (the molded articles are connected by film 64 only), then regions 200 wherein a relatively greater amount of material 58 is needed, regions 202 wherein relatively less material 58 is needed, then regions 204 in which the greatest relative amount of moldable material is needed, followed again by a region 198 of a film-only connection (no moldable material), etc. Thus, indicators 182 may be placed, e.g., at selected ones of the mold segments 22*b*" near each region 198 as shown. In this manner, and when controller 172 is commanded to operate in a second one of its plurality of modes, receipt of signal 184 from sensor 174 (upon detecting an indicator 182) may result in an increase in the rate of dispensation of moldable material 58 from dispenser 56 (transition from region 198 (with zero or very little dispensation) to region 200), followed by a reduced rate (transition from region 200 to region 202), followed by an increased rate, greater than for region 200 (transition from region 202 to 204), followed by a very low or zero rate (transition from region 204 to 198), at which time the cycle repeats after the next indicator 182 is detected.

As a further example, another, e.g., third, mold-segment set-up may result in a dynamic mold-cavity in which the surface area thereof increases (wherein more film is required), but the volume decreases (such that less moldable material is required). This third set-up may be programmed into controller 172 as a third one of its plurality of modes, e.g., such that receipt of signal 184 from sensor 174, i.e., upon detecting an indicator 182, results in both a decrease in the rate of dispensation of moldable material (signal 178) and at least one of an increase in the rate of film feeding (signal 180) and a decrease in the rate of mold-segment conveyance (signal 176).

An unlimited number of additional modes, for different mold-segment set-ups and configurations, are also possible in accordance with the present embodiment of the invention.

Referring now to FIGS. 2, 21, and 22A-22B, another feature of the invention will be described. In this embodiment, the film-feeding mechanism 62 may include a film-guide device 206 to effect the feeding of the film(s) 64 into the dynamic mold-cavity 20 at a predetermined angle. The film-guide device 206 may be affixed to apparatus 10 at frame 112, e.g., via a support bracket or the like (not shown), to which the device 206 is attached. This feature may be advantageous, e.g., when the dynamic mold-cavity 20 is relatively deeper within the lower molding assembly 16b vs. that of the upper molding assembly 16a, in which case it would be helpful to guide the film(s) 64 at a downward angle into such deeper part of the mold-cavity in lower molding assembly 16b. Conversely, when the dynamic mold-cavity 20 is relatively deeper within the upper molding assembly 16a vs. that of the lower molding assembly 16b, it would be helpful to guide the film (s) 64 at an upward angle into such deeper part of the mold-cavity in upper molding assembly 16a.

Figure 22A:
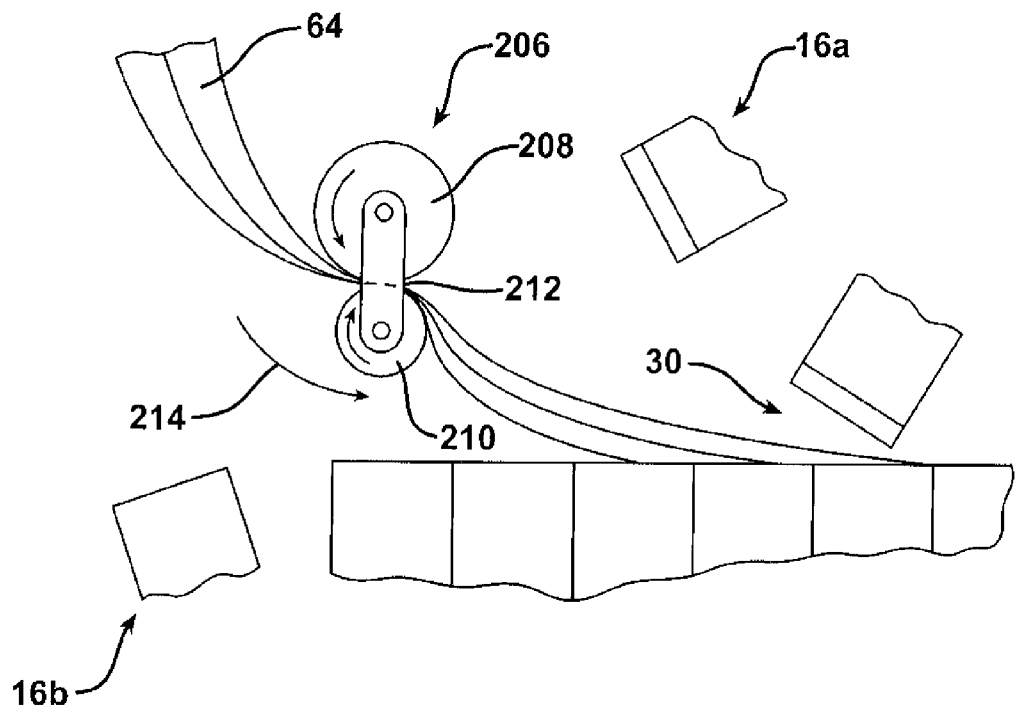
FIGS. 22A and 22B show different angular orientations of the device shown in FIG. 21.
Figure 22B:
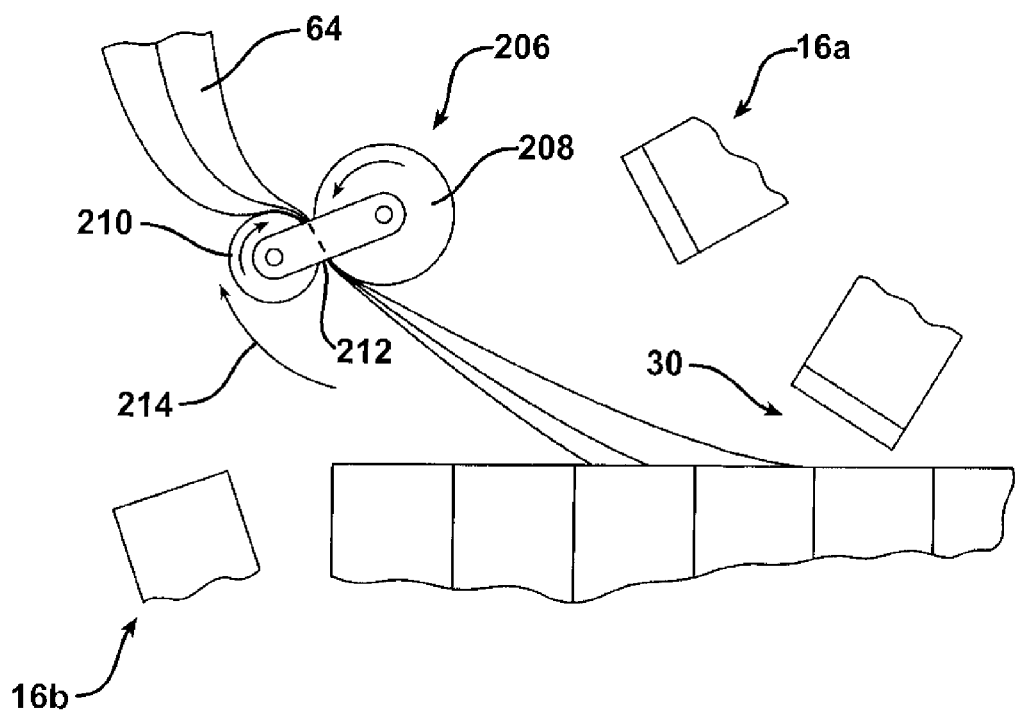

Accordingly, the film-guide device 206 may be adjustable such that the predetermined angle of film-feed can be varied as desired, i.e., downward or upward. This may be effected as illustrated by constructing the film-guide device 206 from a pair of counter-rotating rollers 208 and 210 having a tangential point of contact 212 therebetween, through which the film(s) 64 are directed to determine the desired angle. The rollers 208, 210 may further be capable of relative movement such that the tangential point of contact 212 varies with such relative movement, thereby varying the film-feed angle. For example, the relative movement between the rollers 208, 210 may constitute relative axial movement, e.g., relative arcuate movement, with one of the rollers, e.g., roller 210, being adjustable along arc 214 as shown. Thus, as shown in FIG. 22A, counter-clockwise movement of roller 210 along arc 214 moves the tangential point of contact 212 counter-clockwise along roller 208, and thereby lifts the film(s) 64 by increasing the entrance-angle of film(s) 64 into the entrance point 30 of the movable mold 18. In contrast, as shown in FIG. 22B, clock-wise movement of roller 210 along arc 214 moves the tangential point 212 in a clock-wise direction and thereby provides for a relatively decreased, i.e., downwards, entrance-angle of film(s) 64 into the entrance point 30 of the movable mold 18.

If desired, one of the rollers, e.g., roller 210, may be smaller in diameter than the other roller, e.g., roller 208, as shown, e.g., in order to alleviate any space constraints that may exist near the entrance 30 into the movable mold 18. If further desired, at least one of the rollers 208, 210, e.g., the larger roller 208, may be driven (drive means not shown), to further assist in feeding film(s) 64 into the dynamic mold-cavity 20.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A molding apparatus for making a continuous molded article or continuous series of molded articles, comprising:
   a. a pair of spaced-apart molding assemblies, which cooperatively generate a movable mold having a dynamic mold-cavity therein, each of said molding assemblies comprising:
      1) a series of movable mold segments, which are adapted to fit together to form a portion of said dynamic mold-cavity, and
      2) a drive mechanism for conveying said mold segments along a path at a controlled rate, each of said mold segments affixed to said drive mechanism with a predetermined alignment to continuously form said portion of said dynamic mold-cavity as said mold segments are conveyed along said path;
   b. a dispenser for dispensing a moldable material into said dynamic mold-cavity at a controlled rate;
   c. a film-feeding mechanism for feeding one or more films from a source thereof at a controlled rate and into said dynamic mold-cavity such that said films are interposed between said moldable material and said molding assemblies;
   d. a controller for controlling at least one of said drive mechanism, dispenser, and film-feeding mechanism;
   e. an indicator associated with one or more of said mold segments; and
   f. a sensor positioned on said molding apparatus for detecting the presence of said indicator, said sensor being operative to send a signal to said controller upon detecting the presence of said indicator at a predetermined location on said apparatus,
   wherein: upon receipt of said signal from said sensor, said controller changes said rate of at least one of said conveyance of said mold segments, dispensation of said moldable material, and feeding of said films,
   said controller is adapted to operate in a plurality of modes, and
   for each of said modes, said receipt of said signal from said sensor results in a predetermined response from said controller, said plurality of modes including at least one of:
   a first mode, wherein receipt of said signal from said sensor results in at least one of an increase in said rate of film feeding and a decrease in said rate of said mold-segment conveyance,
   a second mode, wherein receipt of said signal from said sensor results in an increase in said rate of dispensation of said moldable material, and
   a third mode, wherein receipt of said signal from said sensor results in a decrease in said rate of dispensation of said moldable material and at least one of an increase in said rate of film feeding and a decrease in said rate of said mold-segment conveyance.

2. The apparatus of claim 1, wherein said film-feeding mechanism includes a film-guide device to effect said feeding of said films into said dynamic mold-cavity at a predetermined angle relative to said dynamic mold-cavity.

3. The apparatus of claim 2, wherein said film-guide device is adjustable such that said angle can be varied as desired.

4. The apparatus of claim 2, wherein said film-guide device comprises a pair of rollers having a tangential point of contact therebetween, through which said films are directed to determine said angle.

5. The apparatus of claim 4, wherein said rollers are capable of relative movement such that said tangential point of contact varies with said relative movement, thereby varying said angle.

6. A molding apparatus for making a continuous molded article or continuous series of molded articles, comprising:
   a. a pair of spaced-apart molding assemblies, which cooperatively generate a movable mold having a dynamic mold-cavity therein, each of said molding assemblies comprising:
      1) a series of movable mold segments, which are adapted to fit together to form a portion of said dynamic mold-cavity, and
      2) a drive mechanism for conveying said mold segments along a path at a controlled rate, each of said mold segments affixed to said drive mechanism with a predetermined alignment to continuously form said portion of said dynamic mold-cavity as said mold segments are conveyed along said path;
   b. a dispenser for dispensing a moldable material into said dynamic mold-cavity at a controlled rate; and
   c. a film-feeding mechanism for feeding one or more films from a source thereof at a controlled rate into said dynamic mold-cavity such that said films are interposed between said moldable material and said molding assemblies so that said continuous molded article or series thereof comprises said moldable material enclosed within said film, said film-feeding mechanism including a film-guide device to effect said feeding of said films into said dynamic mold-cavity at a predetermined angle relative to said dynamic mold-cavity, said film-guide device being adjustable such that said angle can be varied as desired.

7. The apparatus of claim 6, wherein said film-guide device comprises a pair of rollers having a tangential point of contact therebetween, through which said films are directed to determine said angle.

8. The apparatus of claim 7, wherein said rollers are capable of relative movement such that said tangential point of contact varies with said relative movement, thereby varying said angle.

* * * * *